(12) United States Patent
Momoki

(10) Patent No.: US 7,511,889 B2
(45) Date of Patent: Mar. 31, 2009

(54) COLOR SEPARATION/COMBINATION PRISM AND IMAGE-PROJECTION APPARATUS

(75) Inventor: Kazuhiko Momoki, Koshigaya (JP)

(73) Assignee: Canon Kabushiki Kaisha, Tokyo (JP)

( * ) Notice: Subject to any disclaimer, the term of this patent is extended or adjusted under 35 U.S.C. 154(b) by 59 days.

(21) Appl. No.: 11/691,577

(22) Filed: Mar. 27, 2007

(65) Prior Publication Data

US 2007/0229963 A1    Oct. 4, 2007

(30) Foreign Application Priority Data

Apr. 3, 2006    (JP)    .............................. 2006-102284

(51) Int. Cl.
G02B 27/14 (2006.01)
G03B 21/00 (2006.01)
G02F 1/1335 (2006.01)
(52) U.S. Cl. .......................... 359/634; 353/31; 349/106
(58) Field of Classification Search ................. 359/634, 359/640, 638, 639, 629, 625, 624; 353/31, 353/33–34, 70, 84, 99; 349/5–9, 106; 348/744, 348/758, 790–791
See application file for complete search history.

(56) References Cited

U.S. PATENT DOCUMENTS

| | | | |
|---|---|---|---|
| 6,183,091 B1 | 2/2001 | Johnson et al. | |
| 6,618,202 B2 | 9/2003 | Bone et al. | |
| 6,840,626 B2 * | 1/2005 | Ikeda et al. | ................... 353/33 |
| 2003/0151833 A1 * | 8/2003 | Berman et al. | .............. 359/831 |

FOREIGN PATENT DOCUMENTS

JP    2001-154152    6/2001

* cited by examiner

*Primary Examiner*—Scott J Sugarman
*Assistant Examiner*—Dawayne A Pinkney

(57) ABSTRACT

A color separation/combination prism is disclosed which has an optical film arrangement capable of performing color separation, light analysis and color combination. The prism includes four prism members and at least five optical surfaces as outer surfaces thereof. Each of the prism members has at least three optical surfaces including two optical surfaces which intersect orthogonally with each other at a first side thereof. The four prism members are joined together such that the first sides of the prism members are adjacent to or contact each other. Joining portions of the four prism members are provided with wavelength-selective polarizing films.

5 Claims, 16 Drawing Sheets

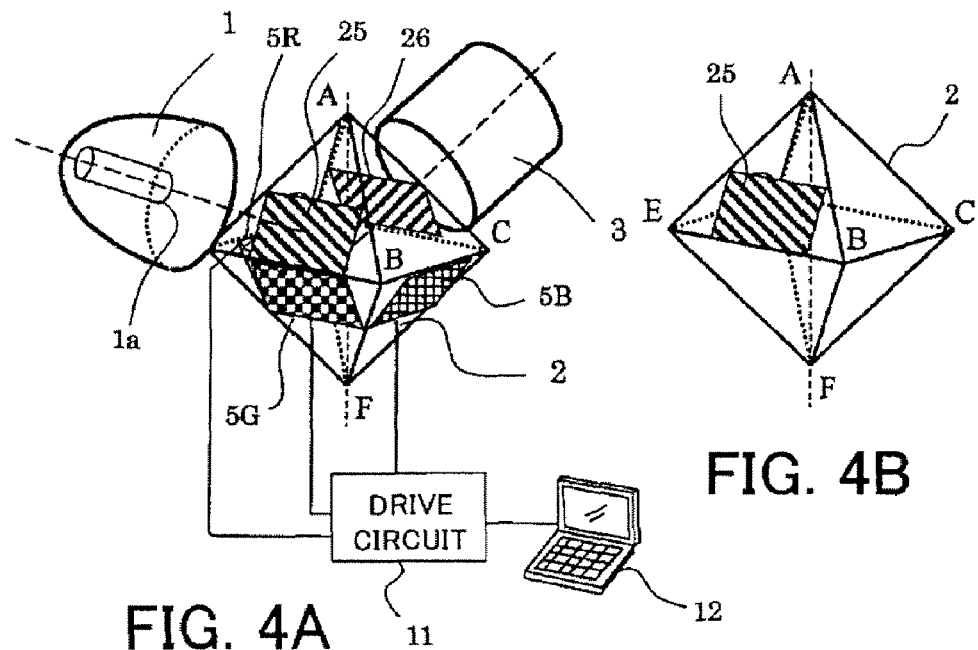
FIG. 4A
FIG. 4B
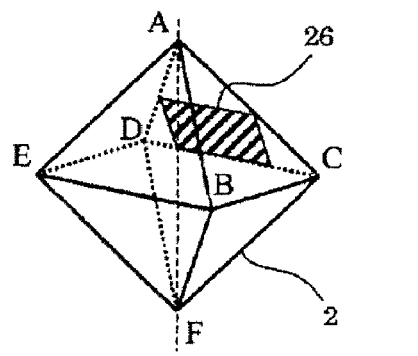
FIG. 4C
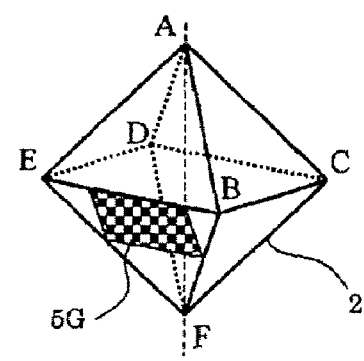
FIG. 4D
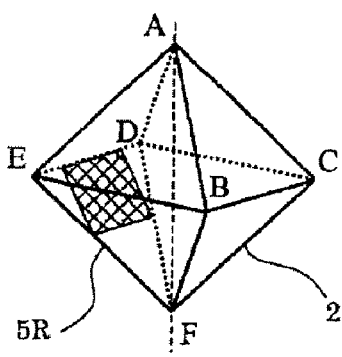
FIG. 4E
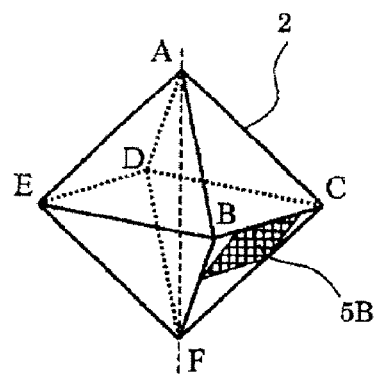
FIG. 4F

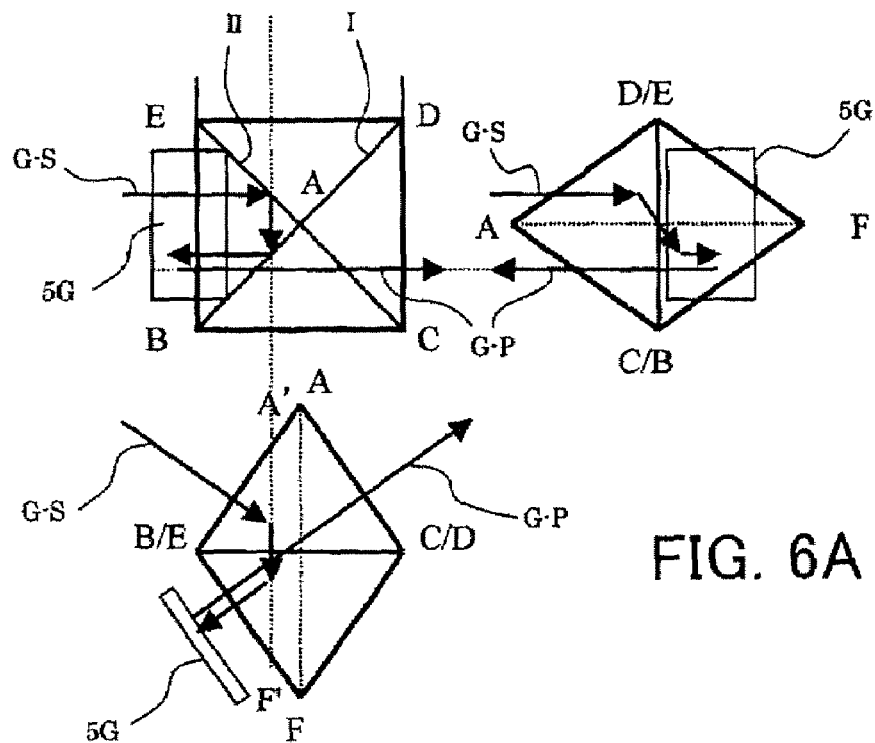
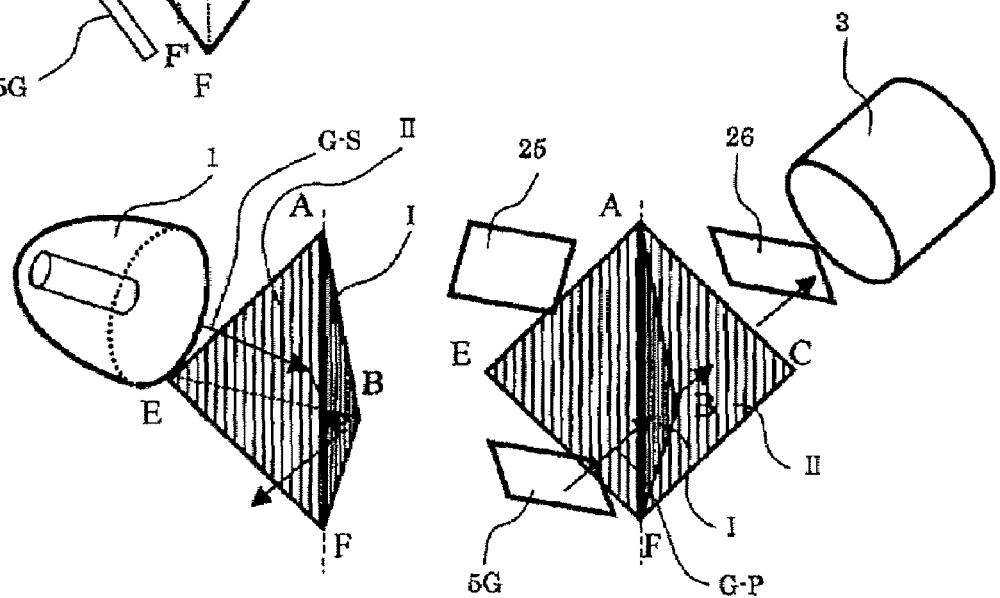
FIG. 6A
FIG. 6B  FIG. 6C

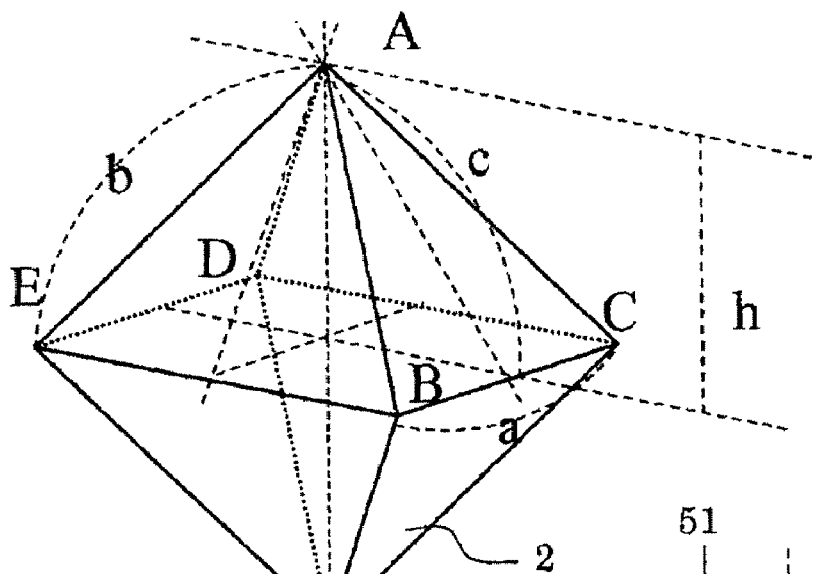
FIG. 9A
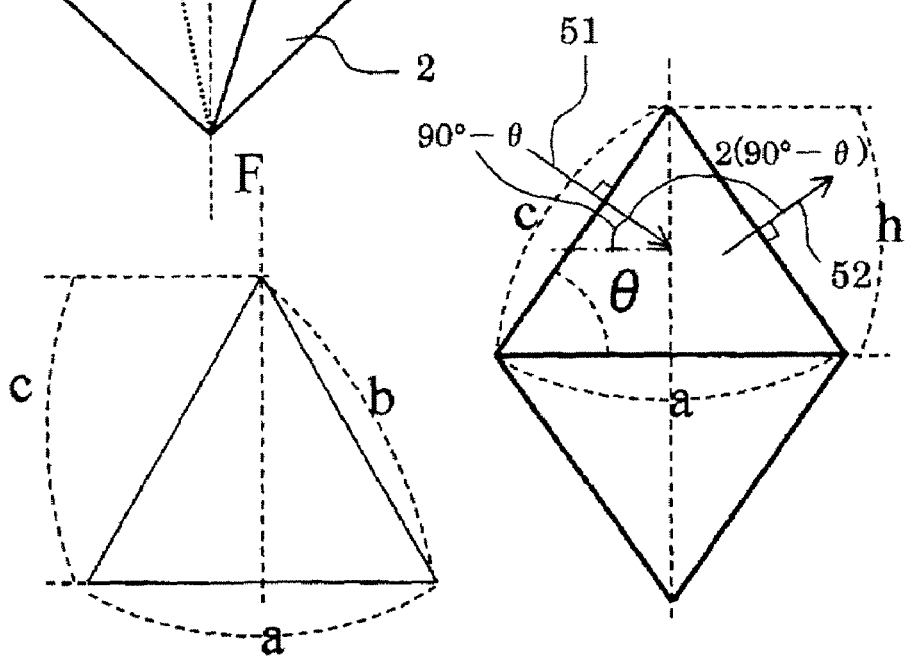
FIG. 9B
FIG. 9C

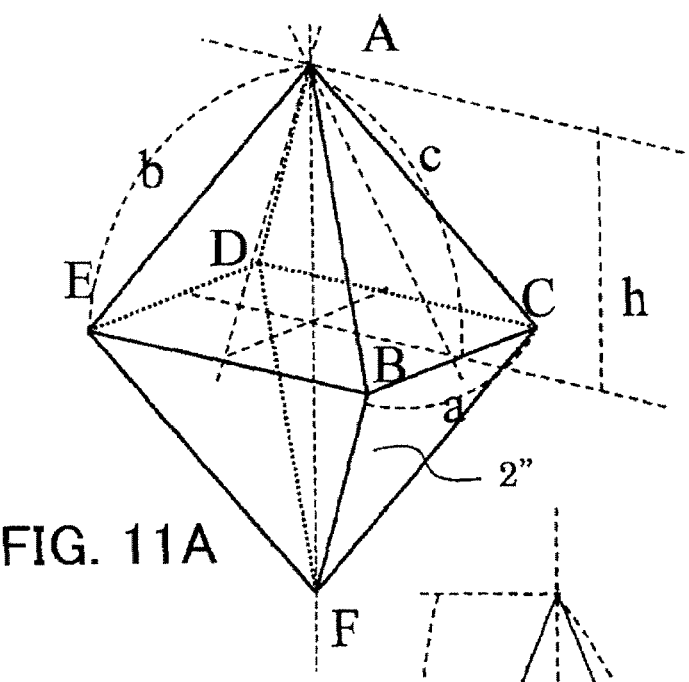
FIG. 11A
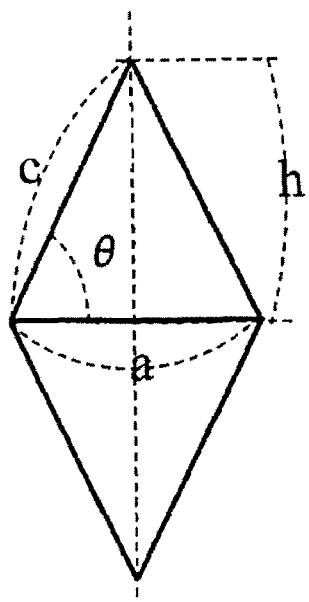
FIG. 11C
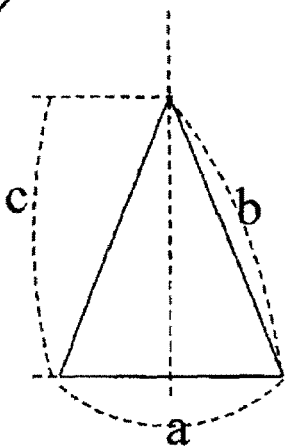
FIG. 11B
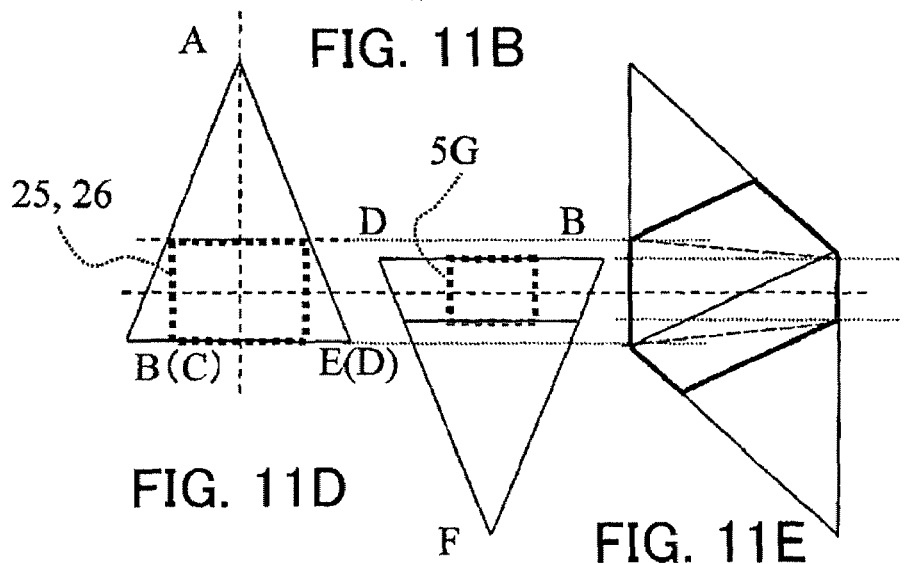
FIG. 11D
FIG. 11E

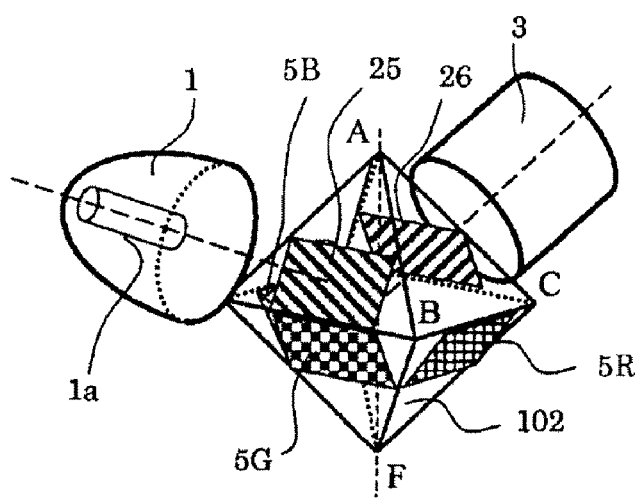
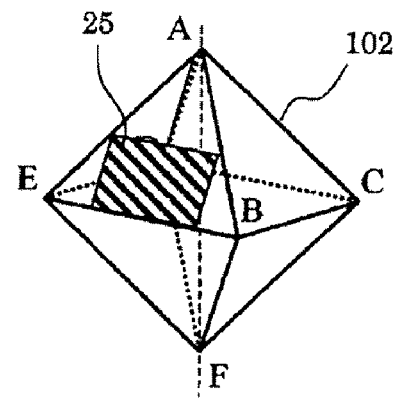
FIG. 14A          FIG. 14B
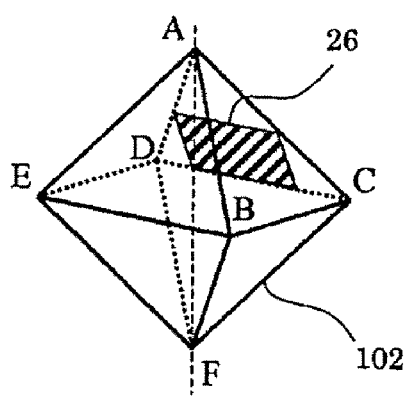
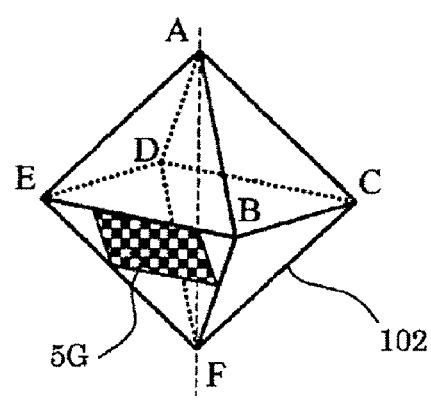
FIG. 14C          FIG. 14D
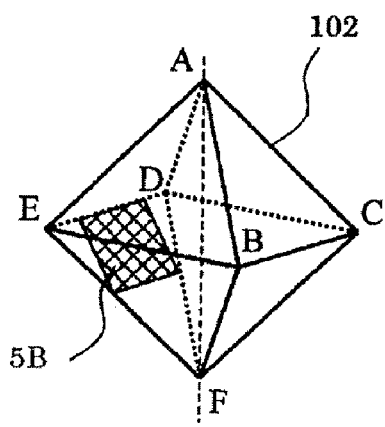
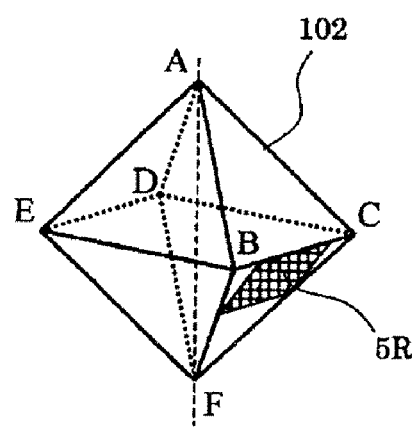
FIG. 14E          FIG. 14F

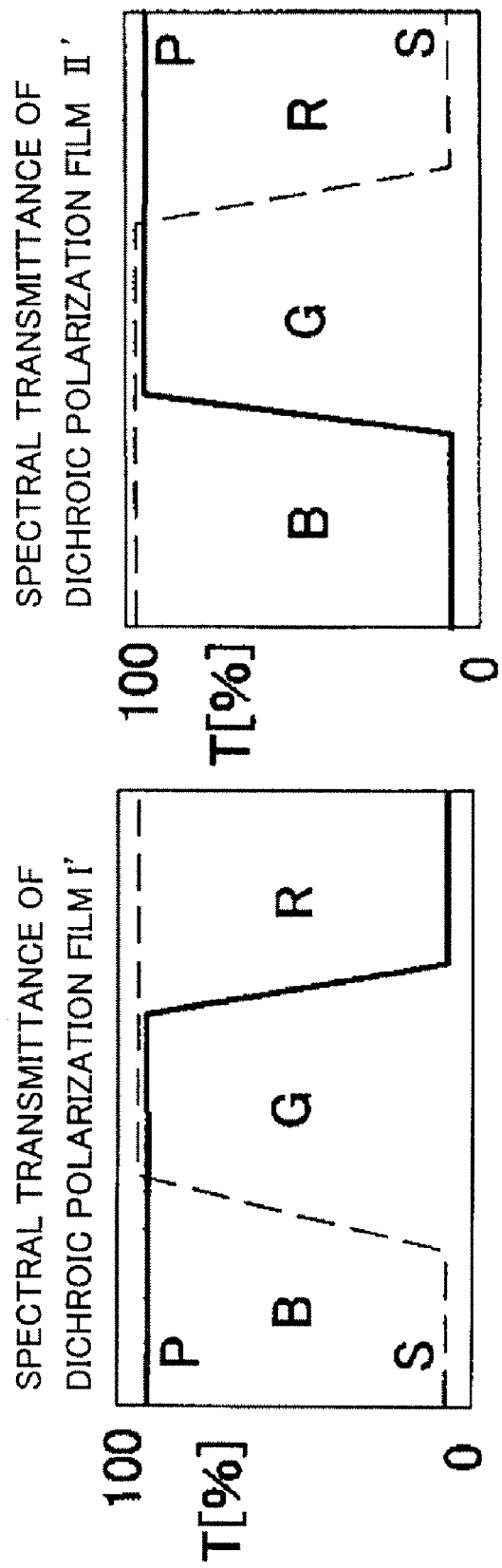

COLOR SEPARATION/COMBINATION PRISM AND IMAGE-PROJECTION APPARATUS

BACKGROUND OF THE INVENTION

The present invention relates to a color separation/combination prism suitable for an image-projection apparatus which projects an image using an image-forming element such as a reflective liquid crystal panel.

A color separation/combination system of a projector using a reflective liquid crystal panel needs to perform color separation and color combination of red (R), green (G) and blue (B) and split polarized light modulated by the liquid crystal panel. Such a color separation/combination system generally has a configuration using three to four optical elements including two polarization beam splitters (PBSs) having a polarization beam splitting film which forms an angle of 45 degrees with respect to an optical axis of incident light.

Japanese Patent Laid-Open No. 2001-154152 discloses an optical system having two polarization beam splitters and two dichroic mirrors arranged on the optical axis of a reflective liquid crystal panel. It also discloses a configuration in which three polarization beam splitters and one dichroic mirror are arranged. According to these configurations, four optical elements are arranged in a positional relationship of 2×2 and optical films of the four optical elements are arranged in two directions orthogonal to each other. The four optical elements perform color separation, light analysis and color combination.

Furthermore, Japanese Patent Laid-Open No. 2002-162520 discloses a prism which singly performs color separation, color combination and polarization split. This prism is configured by arranging in a cube three polarization/dichroic beam splitting films which form an angle of 45° with respect to the optical axis of incident light. The cube has twelve sides therein. Of those sides, three sides meet at each vertex. A polarization/dichroic beam splitting film is arranged on a surface that forms an angle of 45° with respect to two surfaces contacting each of the three sides and includes that side. In this way, a prism including three 45° polarization/dichroic beam splitting films which transmit through one vertex is formed.

Reflective liquid crystal panels of RGB are respectively arranged in the vicinity of three surfaces which meet at one vertex out of the surfaces of the cube, and an entrance surface for light from an illumination system and an emergence surface for light toward a projection lens are arranged on the remaining surfaces. The entering light from the illumination system is color-separated by two polarization/dichroic beam splitting films. The light subjected to image modulation on each panel is analyzed and color-combined by two polarization/dichroic beam splitting films and guided to a projection lens.

Furthermore, Japanese Patent Laid-Open No. 2003-98315 discloses an optical system which causes light to transmit through one cross-dichroic mirror before and after a reflective liquid crystal panel. Entering light from an illumination system is color-separated into light beams of RGB colors by the cross-dichroic mirror, and the separated light beams then obliquely enter panels. The light reflected by the panel at a certain angle enters the cross-dichroic mirror again, but the light enters an area different from the area through which the entering light from the illumination system is transmitted. The color-combined RGB light is guided to a projection optical system.

However, in the optical system disclosed in Japanese Patent Laid-Open No. 2001-154152, the light reflected by each reflective liquid crystal panel is guided to the projection lens through two of the four optical elements. This is because two actions are required; light analysis using the polarization beam splitter and color combination using the dichroic mirror or polarization beam splitter. Therefore, a total of four optical elements are required, and this makes the configuration more complicated. This also extends the optical path length and causes each optical element to grow in size for securing necessary light. Moreover, the back focus of the projection lens becomes longer, which causes the projection lens itself to grow in size, too.

Furthermore, according to the prism disclosed in Japanese Patent Laid-Open No. 2002-162520, border lines produced by the beam splitting films exist in all areas of the prism and the border lines which exist in the areas facing the liquid crystal panel have an influence on an image.

Furthermore, light rays from each liquid crystal panel become light rays horizontal to a polarization/dichroic film which is different from the two polarization/dichroic beam splitting films that function as the beam splitting films for the light rays and enter the different film at a large incident angle. Thereby, the light rays are reflected at a high reflectance to cause a ghost.

Furthermore, according to the optical system disclosed in Japanese Patent Laid-Open No. 2003-98315, color-separated RGB light beams are obliquely entered into the liquid crystal panel to prevent the illumination system and the projection optical system from physically interfering with each other. Therefore, the distance from the cross-dichroic mirror to the liquid crystal panel becomes longer and the cross-dichroic mirror also grows in size. Moreover, incident light upon the reflective liquid crystal panel also has a large angle, which not only is disadvantageous from the standpoint of the incident angle characteristic of the panel but also requires the projection optical system to be a decentered optical system.

SUMMARY OF THE INVENTION

As one aspect, the present invention provides a color separation/combination prism which includes four prism members joined together. The color separation/combination prism includes at least five optical surfaces as outer surfaces thereof. Each of the prism members has at least three optical surfaces including two optical surfaces which intersect orthogonally with each other at a first side thereof. The four prism members are joined together such that the first sides of the prism members are adjacent to or contact each other. Joining portions of the four prism members are provided with wavelength-selective polarizing films.

As another aspect, the present invention provides a color separation/combination prism which comprises first and second wavelength-selective polarizing films formed along two planes orthogonal to each other, and first to fourth prism members arranged between the first and second wavelength-selective polarizing films. The first prism member includes an entrance surface for entrance of light components in three wavelength regions and a first transmission surface for emergence and reentrance of light component in one of the three wavelength regions after reflections by the first and second wavelength-selective polarizing films. The second and third prism members arranged on both sides of the first prism member have second and third transmission surfaces for emergence and reentrance of light components in the other two wavelength regions after reflection by or transmission through the first and second wavelength-selective polarizing films. The fourth prism member arranged between the second and third prism members and opposite to the first prism member has an emergence surface for emergence of the light components in the three wavelength regions after the reentrance through the first to third transmission surfaces and the reflection by or the transmission through the first and second wavelength-selective polarizing films.

As yet another aspect, the present invention provides an image-projection apparatus which comprises an illumination system, first, second, and third image-forming elements, the above color separation/combination prism for guiding light from the illumination system to the first to third image-forming elements based on wavelength regions and causing light from the first to third image-forming elements to emerge, and a projection system for projecting the light from the color separation/combination prism.

As still yet another aspect, the present invention provides an image-projection apparatus which comprises a color separation/combination optical system including wavelength-selective polarizing films formed along two planes intersecting orthogonally with each other at a first axis, an illumination system which provides illumination light to the color separation/combination optical system obliquely with respect to the first axis, a projection system which projects light from the color separation/combination optical system, and three image-forming elements. The illumination light is separated into light components in three wavelength regions by the color separation/combination optical system to enter the three image-forming elements, respectively. The light components from the three image-forming elements are combined and analyzed by the color separation/combination optical system and then guided to the projection system. An optical axis of the projection system is perpendicular to the entrance/emergence surface of each of the image-forming elements.

Other objects and features of the present invention will become apparent from the following description and the attached drawings.

BRIEF DESCRIPTION OF THE DRAWINGS

FIGS. 4A to 4F are diagrams showing the configuration of a projector using the color separation/combination prism of Embodiment 1 and optical surfaces of the color separation/combination prism;

FIGS. 6A to 6C are optical path diagrams of G light according to Embodiment 1;

FIGS. 9A to C are diagrams showing a shape of the color separation/combination prism of Embodiment 1;

FIGS. 11A to 11E are diagrams showing a still another shape of the color separation/combination prism of Embodiment 1;

FIGS. 14A to 14F are diagrams showing the configuration of a projector using a color separation/combination prism that is Embodiment 2 of the present invention and optical surfaces of the color separation/combination prism;

FIGS. 17A and 17B are diagrams showing characteristics of the dichroic films used for a color separation/combination prism that is a modification example of Embodiments 1 and 2.

DESCRIPTION OF THE EMBODIMENTS

Figure 1:
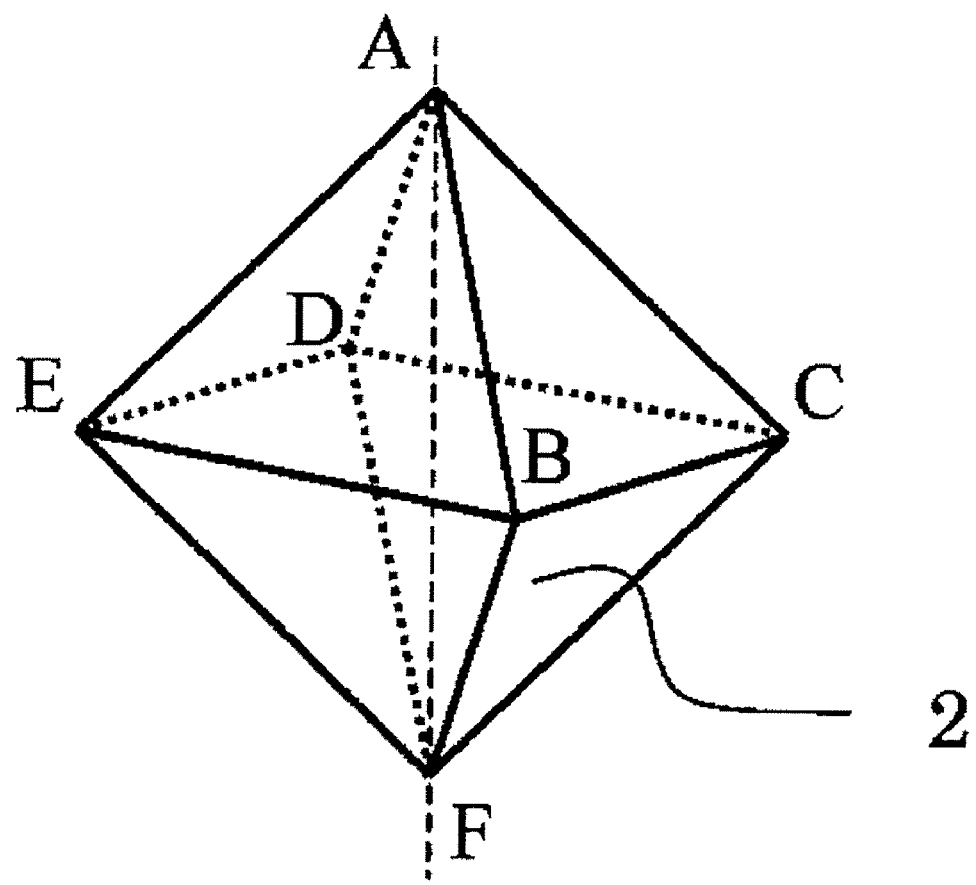
FIG. 1 is a diagram showing an overall shape of a color separation/combination prism that is Embodiment 1 of the present invention.

Hereinafter, preferred embodiments of the present invention will be described with reference to the accompanying drawings.

First Embodiment

FIG. 4A shows the configuration of an overall optical system of a projector (image-projection apparatus) using a color separation/combination prism which is Embodiment 1 of the present invention.

Reference numeral 1 denotes an illumination optical system (illumination system) including at least a light source lamp 1a and a wavelength-selective polarization conversion element (not shown). The illumination optical system 1 emits light in which each light component of R, G, and B wavelength regions has a polarization direction made uniform by the wavelength-selective polarization conversion element. In this embodiment, S-polarized light of G and P-polarized light of R and B are emitted. Moreover, the light emitted from the illumination optical system 1 is substantially parallel luminous flux (substantially telecentric luminous flux).

The S-polarized light of G and P-polarized light of R and B from the illumination optical system 1 enter the color separation/combination prism 2.

The color separation/combination prism 2 splits the entering polarized light of R, G, B using a dichroic polarizing film which will be described later and is a wavelength-selective polarizing film, analyzes the split polarized light components and guides those light components to reflective liquid crystal panels 5R, 5G, and 5B which are image-forming elements.

A drive circuit 11 is connected to the reflective liquid crystal panels (hereinafter, simply referred to as "panels") 5R, 5G, and 5B, and image information is input to the drive circuit 11 from an image supply apparatus such as a personal computer, DVD player, video deck, television tuner. The drive circuit 11 drives the panels 5R, 5G, and 5B according to the input image information.

The polarized light components of R, G, and B enter the panels 5R, 5G, and 5B are modulated according to images formed on the corresponding panels and reflected thereby. The polarized light components reflected by the panels 5R, 5G, and 5B enter the color separation/combination prism 2 again, and are color-combined by the dichroic polarizing films. The combined light emerges from the color separation/combination prism 2.

The color-combined light that has emerged from the color separation/combination prism 2 is projected by a projection optical system (projection system) 3 onto a projection surface such as a screen (not shown).

FIG. 1 shows the color separation/combination prism of this embodiment. The color separation/combination prism constitutes a color separation/combination optical system, and the color separation/combination prism and the three liquid crystal panels constitute an image-forming optical system.

The color separation/combination prism 2 has a basic shape of an octahedron having eight isosceles triangle outer surfaces. Reference characters A to F are assigned to vertices of the octahedron.

The color separation/combination prism 2 is formed by bonding (or joining, or cementing) together four small prisms (prism members) having an identical shape, which are shown in FIGS. 2A to 2D.

Figure 2A:
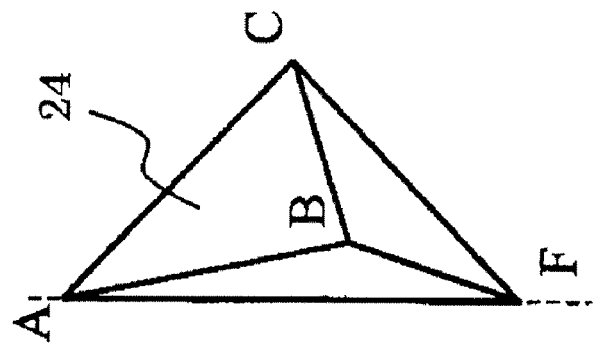
FIGS. 2A to 2D are diagrams showing small prisms constituting the color separation/combination prism of Embodiment 1.
Figure 2B:
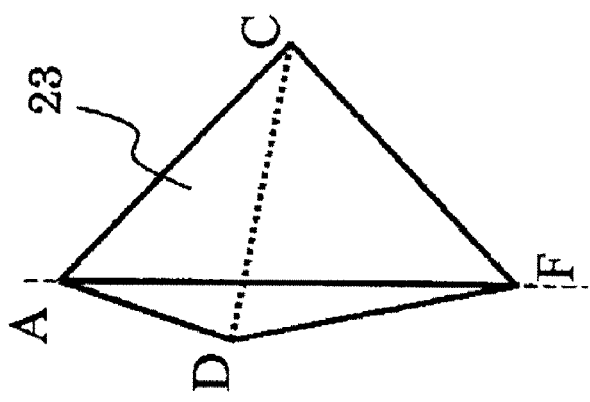

A first small prism 21 shown in FIG. 2A is a tetrahedron having four surfaces and four vertices which correspond to vertices A, E, B, and F of the color separation/combination prism 2. A second small prism 22 shown in FIG. 2B is a tetrahedron having four surfaces and four vertices which correspond to vertices A, D, E, and F of the color separation/combination prism 2.

Figure 2C:
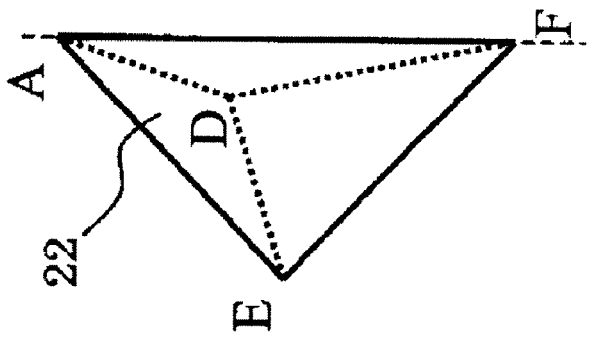
Figure 2D:
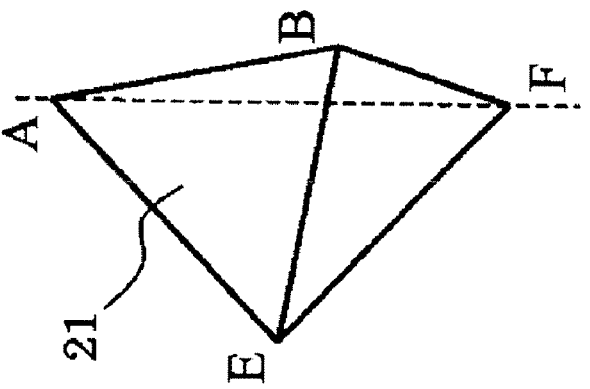

A third small prism 23 shown in FIG. 2C is a tetrahedron having four surfaces and four vertices which correspond to vertices A, C, D, and F of the color separation/combination prism 2. A fourth small prism 24 shown in FIG. 2D is a tetrahedron having four surfaces and four vertices which correspond to vertices A, B, C, and F of the color separation/combination prism 2.

In the following descriptions, the vertices corresponding to the vertices A to F of the color separation/combination prism 2 in each small prism are also assigned reference characters A to F.

Of the four surfaces which constitute the first small prism 21, a surface ABF and a surface AEF intersect orthogonally with each other at a side (first side) AF. Of the four surfaces which constitute the second small prism 22, a surface ADF and a surface AEF intersect orthogonally with each other at a side (first side) AF. Of the four surfaces which constitute the third small prism 23, a surface AFC and a surface ADF intersect orthogonally with each other at a side (first side) AF. Of the four surfaces which constitute the fourth small prism 24, a surface ABF and a surface ACF intersect orthogonally with each other at a side (first side) AF.

Figure 3A:
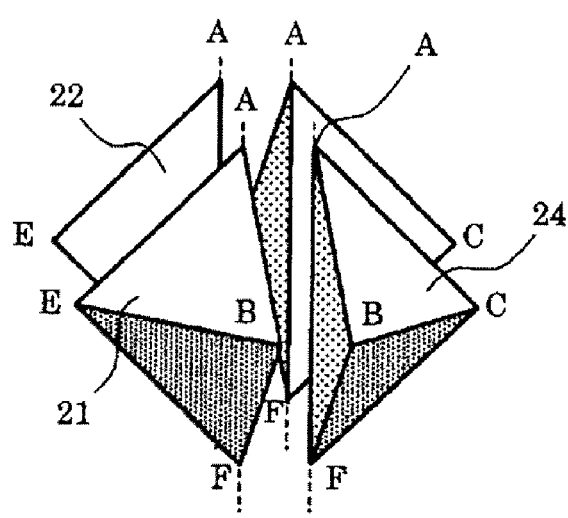
FIGS. 3A to 3C are diagrams showing a method of manufacturing the color separation/combination prism of Embodiment 1.
Figure 3B:
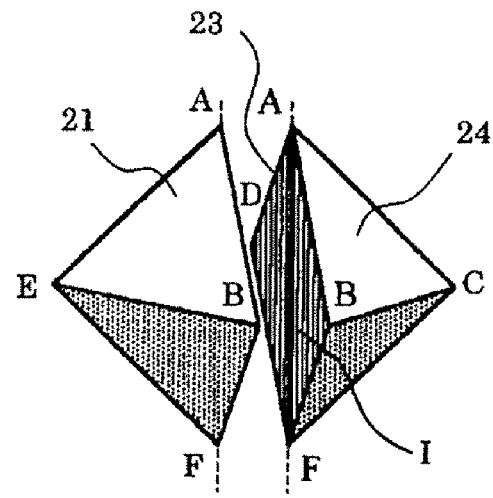
Figure 3C:
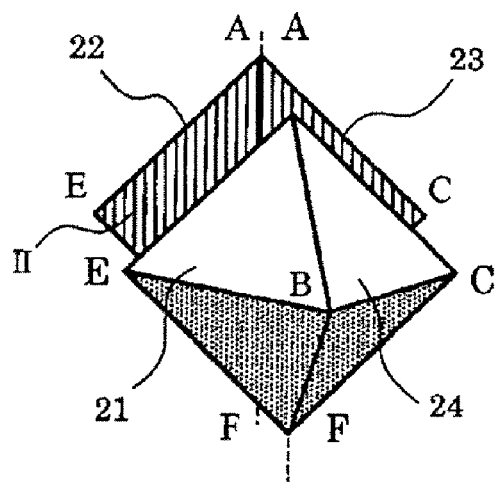

FIGS. 3A to 3C show how the first to fourth small prisms 21 to 24 are bonded together.

As shown in FIG. 3A, the first small prism 21 and the second small prism 22 are bonded together on the surface AEF. In the same way, the second small prism 22 and the third small prism 23 are bonded together on the surface ADF. Moreover, the third small prism 23 and the fourth small prism 24 are bonded together on the surface ACF. Furthermore, the fourth small prism 24 and the first small prism 21 are bonded together on the surface ABF.

In this way, the first to fourth small prisms 21 to 24 are bonded together so as to match their respective sides AF (so that their respective sides AF contact each other) and a one-piece color separation/combination prism 2 whose bonding surfaces extend in two directions orthogonal to each other is formed. However, dichroic polarizing films are actually arranged between the bonding surfaces of the respective small prisms. Therefore, the sides AF of the first to fourth small prisms 21 to 24 do not completely match in a microscopic view, but they are arranged close to each other spaced apart with a distance corresponding to the thickness of the dichroic polarizing film and the adhesive. However, the following descriptions will assume that the sides AF of the first to fourth small prisms 21 to 24 match.

On the assumption of this, in other words, the color separation/combination prism 2 can be said to be formed by bonding together the first to fourth small prisms 21 to 24 so that their respective sides AF match the axis of symmetry (first axis) AF.

As shown in FIG. 3B, a dichroic polarizing film I which is a first wavelength-selective polarizing film is arranged on the bonding surface ABFD. As shown in FIG. 3C, a dichroic polarizing film II which is a second wavelength-selective polarizing film is arranged on the bonding surface ACFE. This causes the dichroic polarizing films I and II to be cross-arranged along two plane surfaces which are orthogonal to each other with respect to the axis of symmetry AF in the bonding portions of the first to fourth small prisms 21 to 24. The more specific structure and characteristics of each dichroic polarizing film will be described later.

Next, the optical surfaces of the color separation/combination prism 2 will be described with reference to FIGS. 4A to 4F. As shown in FIG. 4A, the color separation/combination prism 2 has an area 25 as an entrance surface for entering light, which is not color-separated yet, from the illumination optical system 1, areas as transmission surfaces where the three panels 5R, 5G, and 5B face, and an emergence surface 26 from which the color-combined light emerges toward the projection lens 3.

The area 25 as the entrance surface is provided on the surface AEB as shown in FIG. 4B. Furthermore, the area 26 as the emergence surface is provided on the surface ACD as shown in FIG. 4C.

Furthermore, as shown in FIG. 4D, the panel 5G is arranged so as to be close to and face the surface EBF that is a transmission surface. As shown in FIG. 4E, the panel 5R is arranged so as to be close to and face the surface DEF that is another transmission surface Furthermore, as shown in FIG. 4F, the panel 5B is arranged so as to be close to and face the surface BCF that is still another transmission surface.

In this embodiment, the panel 5G, surface EBF and emergence surface ACD are arranged in parallel. Furthermore, the panel 5G and panel 5B are arranged in a mirror image relationship with respect to the dichroic polarizing film I. Furthermore, the panel 5G and panel 5R are arranged in a mirror image relationship with respect to the dichroic polarizing film II. Furthermore, the panels 5G, 5B, 5R are arranged such that the optical axis of the projection lens 3 is perpendicular to each panel surface (entrance/emergence surface).

In this embodiment, of the wavelength regions of R, G, B, the wavelength region of G (e.g., 505 to 580 nm) corresponds to a first wavelength region, the wavelength region of B (e.g., 430 to 495 nm) corresponds to a second wavelength region, and the wavelength region of R (e.g., 590 to 650 nm) corresponds to a third wavelength region. Furthermore, the first image-forming element corresponds to the panel 5G, the second image-forming element corresponds to the panel 5B and the third image-forming element corresponds to the panel 5R.

Figures 5A, 5B:
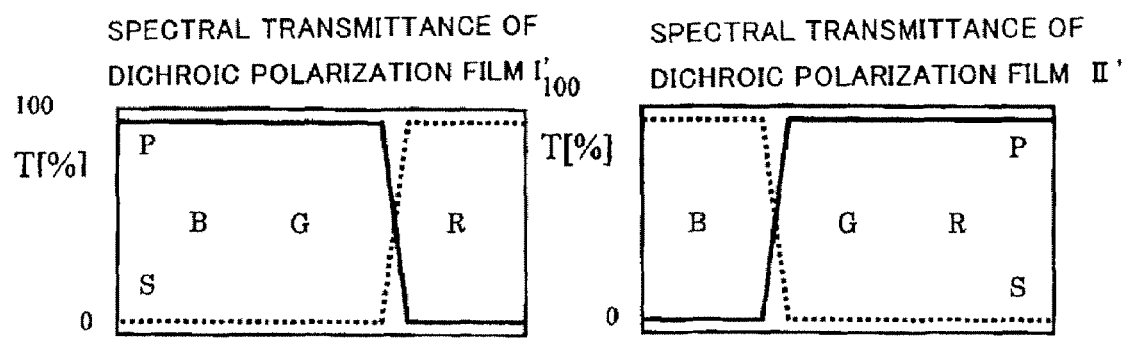
FIGS. 5A to 5C are diagrams showing characteristics of dichroic polarizing films used for the color separation/combination prism of Embodiment 1 (and Embodiment 2)

FIGS. 5A and 5B respectively show the characteristics of the dichroic polarizing films I and II. The dichroic polarizing film I has spectral transmittance characteristics for S-polarized light and P-polarized light which are respectively shown by a dotted line and a solid line in FIG. 5A. That is, the dichroic polarizing film I transmits most of the incident P-polarized light and reflects most of the incident S-polarized light in the wavelength regions of G and B. Furthermore, the dichroic polarizing film I reflects most of the P-polarized light and transmits most of the S-polarized light in the wavelength region of R.

In other words, the dichroic polarizing film I has a lower transmittance for the S-polarized light than that for the P-polarized light in the wavelength region light of G. Furthermore, the dichroic polarizing film I has a higher transmittance for the P-polarized light than that for the S-polarized light in the wavelength region light of B. Furthermore, the dichroic polarizing film I has a lower transmittance for the P-polarized light than that for the S-polarized light in the wavelength region of R.

On the other hand, the dichroic polarizing film II has spectral transmittance characteristics for S-polarized light and P-polarized light which are respectively shown by a dotted line and a solid line in FIG. 5B. That is, the dichroic polarizing film II transmits most of the incident P-polarized light and reflects most of the incident S-polarized light in the wavelength regions of G and R. Furthermore, the dichroic polarizing film II reflects most of the P-polarized light and transmits most of the S-polarized light in the wavelength region of B.

In other words, the dichroic polarizing film II has a lower transmittance for the S-polarized light than that for the P-polarized light in the wavelength region light of G. Furthermore, the dichroic polarizing film II has a lower transmittance for the P-polarized light than that for the S-polarized light in the wavelength region light of B. Moreover, the dichroic polarizing film II has a higher transmittance for P-polarized light than that for the S-polarized light in the wavelength region of R.

Figure 5C:
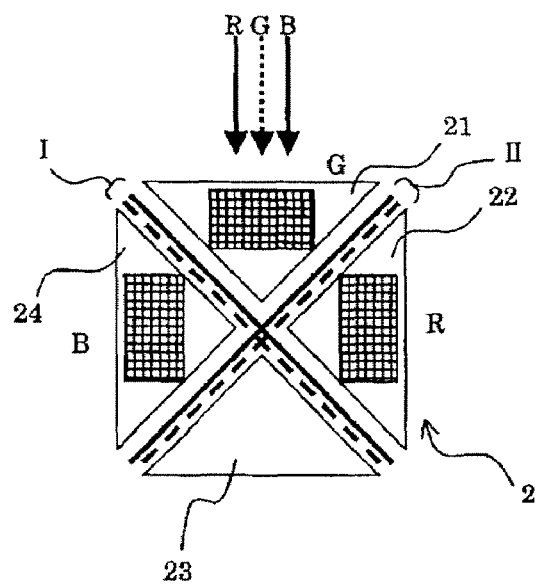

As shown in FIG. 5C, this embodiment causes the S-polarized light in the wavelength region of G from the illumination optical system 1 and S-polarized light in the wavelength regions of R and B to enter the entrance surface of the color separation/combination prism 2. The light from the illumination optical system 1 enters the color separation/combination prism 2 obliquely with respect to the axis of symmetry AF of that prism 2.

Next, color separation, light analysis and color combination actions of the color separation/combination prism 2 will be described. "Upward" and "downward" in the following description mean upward and downward in a side view, respectively.

FIG. 6A shows a top view and two side views of an optical path followed by the G light in the color separation/combination prism 2 viewed from three directions. Of the two side views, the view from the surfaces ACD, FCD side (diagram on the right side) will hereinafter be referred to as a "first side view". On the other hand, the view from the surfaces ABC, FBC side (diagram at the bottom) will hereinafter be referred to as a "second side view".

FIG. 6B shows an optical path of the entering light from the illumination optical system 1 up to the panel 5G, FIG. 6C shows an optical path of the reflected light from the panel G up to the projection lens 3. These FIGS. 6B and 6C show the dichroic polarizing films I and II extracted from the color separation/combination prism 2.

Out of the S-polarized light of G (G-S) that has entered the color separation/combination prism 2 by being transmitted through the entrance surface AEB (area 25) from the illumination optical system 1, the polarized light component incident on the dichroic polarizing film II on the surface AFE is reflected thereby obliquely downward and then reflected obliquely downward by the dichroic polarizing film I on the surface AFB, too. The polarized light component then emerges from the surface FBE to reach the panel 5G. Furthermore, out of the S-polarized light of G, the polarized light component incident on the dichroic polarizing film I on the surface AFB is reflected thereby obliquely downward and then reflected obliquely downward by the dichroic polarizing film II on the surface AFE, too. The polarized light component then emerges from the surface FBE to reach the panel 5G. In this way, most of the S-polarized light of G that has entered the prism 2 from the entrance surface AEB enters the panel 5G.

The dichroic polarizing film II on the surface AFE and the dichroic polarizing film I on the surface AFB are orthogonal to each other and they function as a so-called penta-Dach mirror (or roof mirror) when seen from the S-polarized light of G entered from the illumination optical system 1. That is, when proceeding from the dichroic polarizing film I to the surface FBE, the S-polarized light of G proceeds in a direction parallel to the entering light when seen in the first side view of FIG. 6A. Furthermore, as is seen in the second side view of FIG. 6A, the S-polarized light of G that has reached the straight line A'F' changes its direction so as to proceed along the straight line A'F' and further changes its direction at the straight line A'F' so as to proceed toward the surface FBE. This is the reflection function of the penta-Dach mirror.

Furthermore, as is seen in the second side view, the S-polarized light of G enters the color separation/combination prism 2 from the surface AEB perpendicularly thereto and then emerges from the surface FBE perpendicularly thereto. Moreover, the S-polarized light of G that has emerged from the surface FBE enters the panel 5G perpendicularly thereto.

The G light that has entered the panel 5G is image-modulated and reflected thereby, and then enters the color separation/combination prism 2 again from the surface EBF. The S-polarized light component of the image-modulated G light is reflected twice obliquely upward by the penta-Dach mirror function of the dichroic polarizing film II on the surface AFE and the dichroic polarizing film I on the surface AFB, and returned to the illumination optical system 1 side to be removed from the projection light.

On the other hand, the G image light which is the P-polarized light component of the image-modulated G light (G-P) is transmitted through the dichroic polarizing film II on the surface AFE and the dichroic polarizing film I on the surface AFB obliquely upward. Moreover, the G image light is transmitted through the dichroic polarizing film I on the surface AFD and the dichroic polarizing film II on the surface AFC obliquely upward and then emerges from the surface ACD (area 26) of the color separation/combination prism 2 to proceed toward the projection lens 3.

Figure 7A:
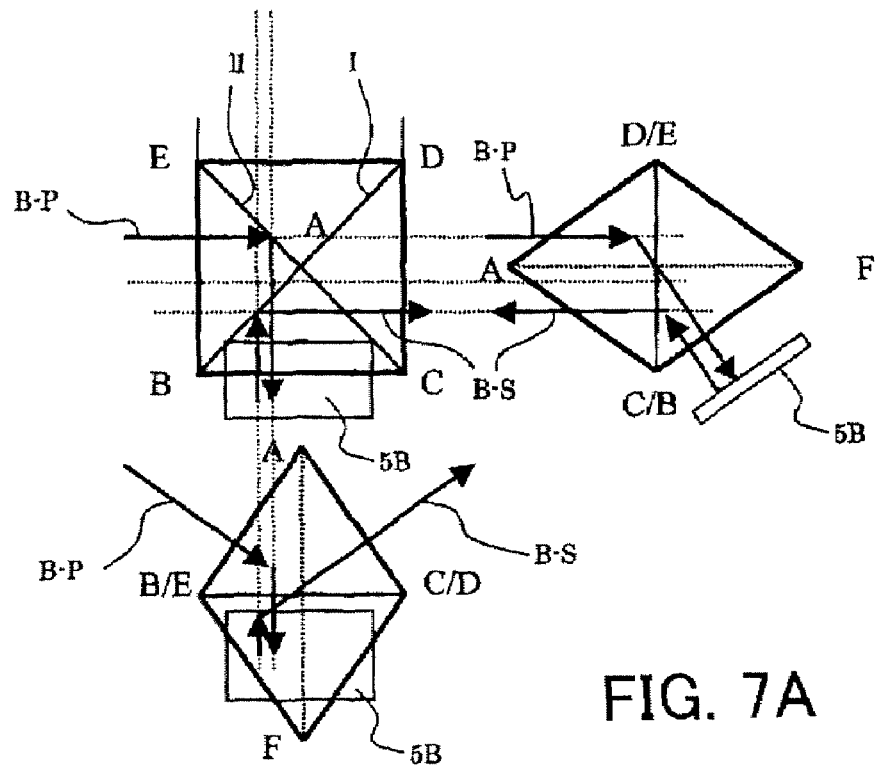
FIGS. 7A to 7C are optical path diagrams of B light according to Embodiment 1.

FIG. 7A shows a top view and two side views of an optical path followed by the B light in the color separation/combination prism 2 viewed from three directions. Of the two side views, the view from the surface ACD, FCD side (diagram on the right side) will hereinafter be referred to as a first side view. Furthermore, the view from the surface ABC, FBC side (diagram at the bottom) will hereinafter be referred to as a second side view.

Figures 7B, 7C:
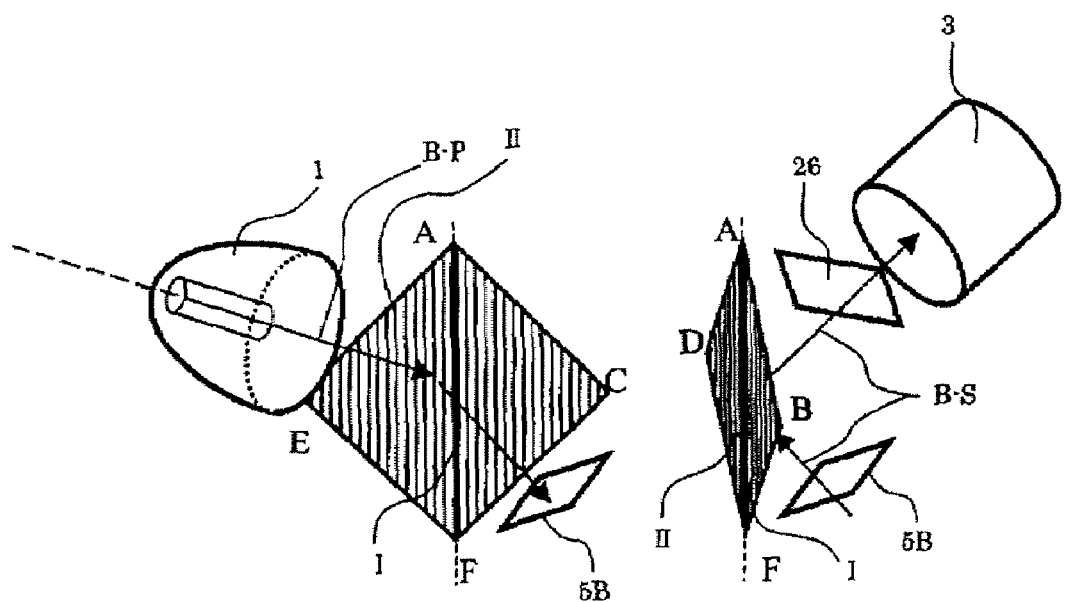

Furthermore, FIG. 7B shows an optical path of the entering light from the illumination optical system 1 up to the panel 5B, FIG. 7C shows an optical path of the reflected light from the panel 5B up to the projection lens 3. These FIGS. 7B and 7C show the dichroic polarizing films I and II extracted from the color separation/combination prism 2.

Out of the P-polarized light of B (B-P) that has entered the color separation/combination prism 2 by being transmitted through the entrance surface AEB from the illumination optical system 1, the polarized light component incident on the dichroic polarizing film II on the surface AFE is reflected thereby obliquely downward and then transmitted through the dichroic polarizing film I on the surface AFB obliquely downward. The polarized light component then emerges from the surface FBC to reach the panel 5B. Furthermore, out of the P-polarized light of B (B-P), the polarized light component incident on the dichroic polarizing film I on the surface AFB is transmitted therethrough obliquely downward and then reflected obliquely downward by the dichroic polarizing film II on the surface AFC. The polarized light component then emerges from the surface FBC to reach the panel 5B. In this way, most of the P-polarized light of B that has entered the prism 2 from the entrance surface AEB enters the panel 5B.

In the case of reflection by the dichroic polarizing film II, as is seen in the top view in FIG. 7A, the P-polarized light of B that has entered the prism 2 from the illumination optical system 1 is reflected as if being deflected by 90° (90 degrees) by the straight line EC.

Furthermore, as is appreciated from the second side view of FIG. 7A, the P-polarized light of B enters the prism 2 from the surface AEB perpendicularly thereto and then emerges from the surface FBC perpendicularly thereto as is appreciated from the first side view. Moreover, the P-polarized light of B that has emerged from the surface FBC enters the panel 5B perpendicularly thereto.

The B light that has entered the panel 5B is image-modulated and reflected thereby, and then reenters the color separation/combination prism 2 from the surface FBC.

Out of the image-modulated B light, the P-polarized light component and the S-polarized light component which is B image light (B-S) proceed as follows. The P-polarized light component returns to the illumination optical system 1 via transmission through the dichroic polarizing film I on the surface AFB and reflection by the dichroic polarizing film II on the surface AFE, or reflection by the dichroic polarizing film II on the surface AFC and transmission through the dichroic polarizing film I on the surface AFB. In this way, the P-polarized light component is removed from the projection light.

On the other hand, the S-polarized light component (B image light) proceeds toward the surface ACD via reflection by the dichroic polarizing film I on the surface AFB and transmission through the dichroic polarizing film II on the surface AFC, or transmission through the dichroic polarizing film II on the surface AFC and reflection by the dichroic polarizing film I on the surface AFD. The B image light then emerges from the surface ACD to proceed toward the projection lens 3. With respect to the B light, transmission and reflection through/by each dichroic polarizing film are performed obliquely upward.

Figure 8A:
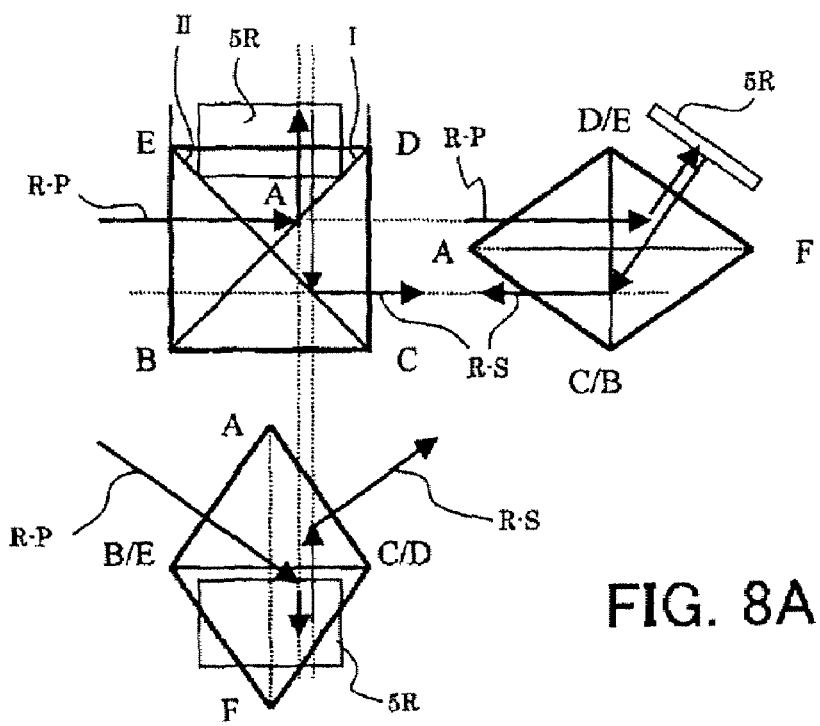
FIGS. 8A to 8C are optical path diagrams of R light according to Embodiment 1.

FIG. 8A shows a top view and two side views of an optical path followed by the R light in the color separation/combination prism 2 viewed from three directions. Of the two side views, the view from the surface ACD, FCD side (diagram on the right side) will hereinafter be referred to as a "first side view". Furthermore, the view from the surface ABC, FBC side (diagram at the bottom) will hereinafter be referred to as a "second side view".

Figures 8B, 8C:
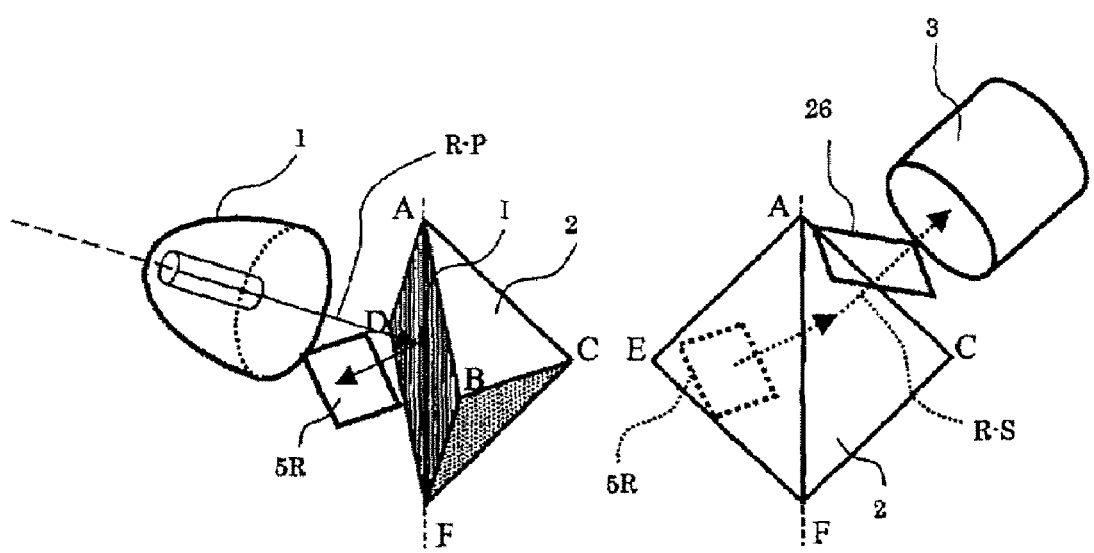

Furthermore, FIG. 8B shows an optical path of the entering light from the illumination optical system 1 up to the panel 5R, FIG. 8C shows an optical path of the reflected light from the panel 5R up to the projection lens 3. These FIGS. 8B and 8C show only a part of the color separation/combination prism 2.

Out of the P-polarized light of R (R-P) that has entered the prism 2 by being transmitted through the entrance surface AEB from the illumination optical system 1, the polarized light component incident on the dichroic polarizing film II on the surface AFE is transmitted therethrough obliquely downward and then reflected obliquely downward by the dichroic polarizing film I on the surface AFD. The polarized light component then emerges from the surface FED to reach the panel 5R. Furthermore, out of the P-polarized light of R (B-P), the polarized light component incident on the dichroic polarizing film I on the surface AFB is reflected thereby obliquely downward and then transmitted through the dichroic polarizing film II on the surface AFE obliquely downward. The polarized light component then emerges from the surface FED to reach the panel 5R. In this way, most of the P-polarized light of R that has entered the prism 2 from the entrance surface AEB enters the panel 5R.

In the case of reflection by the dichroic polarizing film I, as is seen in the top view in FIG. 8A, the P-polarized light of R that has entered the prism 2 from the illumination optical system 1 is reflected as if being deflected by 90° by the straight line DB and proceeds forward.

Furthermore, as is appreciated from the second side view of FIG. 8A, the P-polarized light of R enters the prism 2 from the surface AEB perpendicularly thereto and then emerges from the surface FED perpendicularly thereto as is appreciated from the first side view. Moreover, the P-polarized light of R that has emerged from the surface FED enters the panel 5R perpendicularly thereto.

The R light that has entered the panel 5R is image-modulated and reflected thereby, and then reenters the color separation/combination prism 2 from the surface FED.

Out of the image-modulated R light, the P-polarized light component and the S-polarized light component which is R image light (R-S) proceed as follows. The P-polarized light component returns to the illumination optical system 1 via reflection by the dichroic polarizing film I on the surface AFD and transmission through the dichroic polarizing film II on the surface AFE, or transmission through the dichroic polarizing film II on the surface AFE and reflection by the dichroic polarizing film I on the surface AFB. In this way, the P-polarized light component is removed from the projection light.

On the other hand, the S-polarized light component (R image light) proceeds toward the surface ACD via transmission through the dichroic polarizing film I on the surface AFD and reflection by the dichroic polarizing film II on the surface AFC, or reflection by the dichroic polarizing film II on the surface AFE and transmission through the dichroic polarizing film I on the surface AFD. The R image light then emerges from the surface ACD to proceed toward the projection lens 3. With respect to the R light, transmission and reflection through/by each dichroic polarizing film are performed obliquely upward.

As described above, color-combined image light formed by the P-polarized light of G and the S-polarized light of B and R that has emerged from the surface ACD of the color separation/combination prism 2 and then entered the projection lens 3 is projected onto the projection surface, and thereby a full-color image is displayed.

Table 1 (at the end of the description) shows a numerical example of the color separation/combination prism of this embodiment. The optical surfaces of the color separation/combination prism 2 are located on the surfaces of an octahedron (virtual octahedron) which is defined as a three-dimensional shape formed by eight congruent isosceles triangles. The outer surfaces of the actual color separation/combination prism may be coated with an antireflective coat or the like, but suppose the optical surfaces form the outer surfaces of the color separation/combination prism in this case, too. Furthermore, the shape of the above-described octahedron is determined by defining the ratio of the base of each of eight isosceles triangles to the hypotenuse thereof.

As shown in FIGS. 9A to 9C, with regard to an isosceles triangle ABC, suppose the length of a base BC is a, the length of hypotenuses AB and AC is b. Furthermore, the height thereof is c.

Suppose the height of a rectangular pyramid A-BCDE which is formed by joining the isosceles triangle ABC together with the three isosceles triangles ABE, AED, ADC that are congruent therewith at their respective hypotenuses is h. Furthermore, as shown in FIG. 9C, suppose the base angle which is an angle formed by the base BCDE of the rectangular pyramid A-BCDE and the isosceles triangle ABC (ABE, AED, ADC) is θ.

The color separation/combination prism 2 of this embodiment has a shape with two rectangular pyramids A-BCDE, F-BCDE arranged on both sides of the surface (square surface) BCDE which is orthogonal to the axis of symmetry (side) AF.

The heights c and h are expressed by the following expressions (1) and (2) using a and b.

$$c = \sqrt{b^2 - \left(\frac{a}{2}\right)^2} \quad (1)$$

$$h = \sqrt{b^2 - \frac{a^2}{2}} \quad (2)$$

All the eight surfaces of the octahedron which is the basic shape of the color separation/combination prism 2 of this embodiment are equilateral triangles that are included in isosceles triangles, and the octahedron is formed as a regular octahedron. That is, when a=1, b=1 and each size is as shown in the field of "prism 1" in Table 1. In this case, the base angle θ is 54.7°.

A light ray 51 that has entered the color separation/combination prism 2 from the entrance surface (surface AEB) perpendicularly thereto forms an angle of θ=54.7° with respect to the axis of symmetry AF of the prism 2. According to the sectional view of FIG. 9C, the angle of the light ray 51 with respect to the axis of symmetry AF is 35.3° calculated from 90°−θ. With respect to the light ray entering the color separation/combination prism 2 from the illumination optical system 1, a light ray 52 emerging from the color separation/combination prism 2 toward the projection lens 3 as image light is tilted by 70.6° which is two times this angle.

FIGS. 10A to 10D show a color separation/combination prism which has a shape different from that of the color separation/combination prism shown in FIG. 1. The color separation/combination prism 2' in these figures is formed such that entering light from the illumination optical system 1 and emerging light toward the projection lens 3 form a right angle.

That is, this is the shape in which a base angle θ is 45° and the field of "prism 2" in Table 1 shows each size in this case. The isosceles triangle which forms the octahedron that is the basic shape of the color separation/combination prism 2' is as shown in FIG. 10B.

Figure 10A:
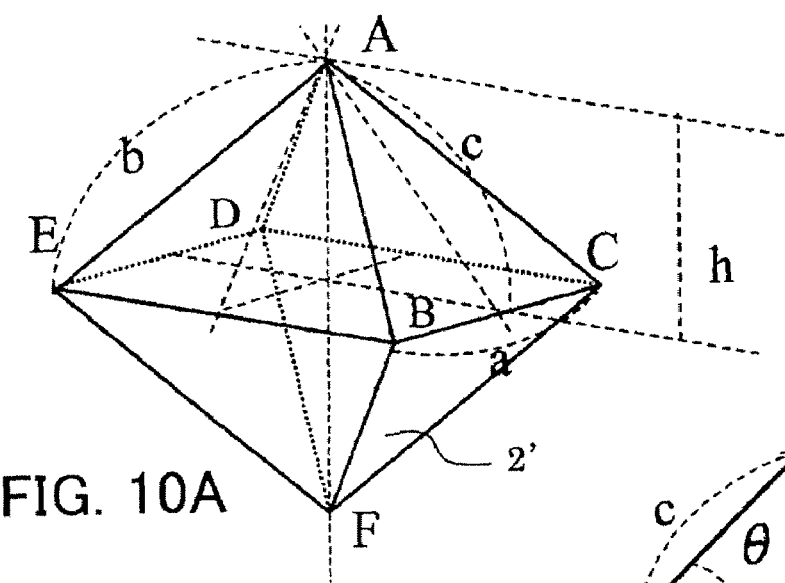
FIGS. 10A to 10D are diagrams showing another shape of the color separation/combination prism of Embodiment 1.
Figure 10C:
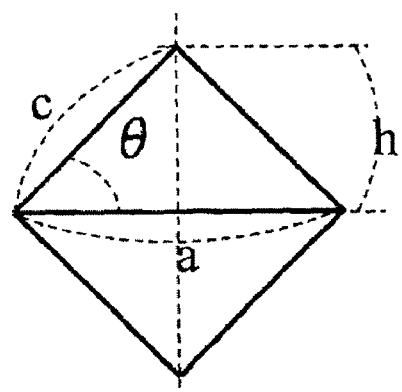
Figure 10B:
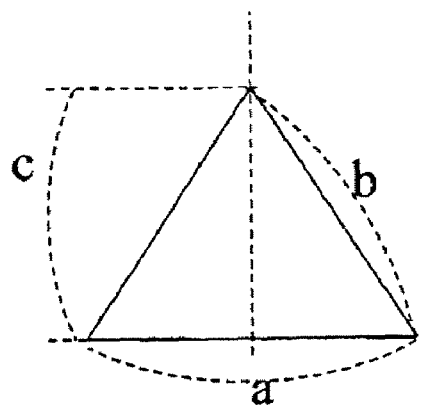

According to FIG. 10C, a light ray (not shown) entering the prism 2' from the entrance surface (surface AEB) perpendicularly thereto forms an angle of 45° with respect to the axis of symmetry AF.

Figure 10D:
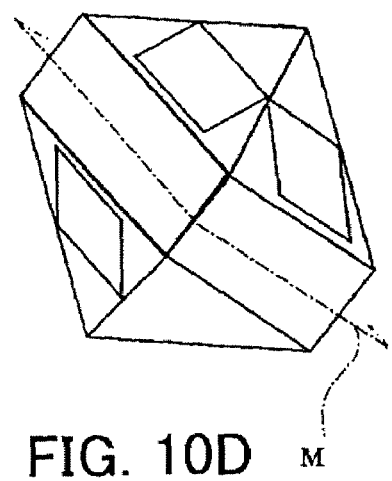

FIG. 10D shows a shape in which optically unnecessary parts in the vicinity of the base of each isosceles triangle that are not used as optical paths are cut for saving of a glass material for forming the color separation/combination prism 2' and for reductions in size and weight thereof. In this case, the color separation/combination prism 2' has such a shape that two rectangular pyramids are arranged on both sides of a plane M which is orthogonal to the axis of symmetry (side) AF and both the square pyramids are joined together by a rectangular parallelepiped.

In the above described color separation/combination prisms 2 and 2', a chamfer on each side or a light-shielding groove in any surface may be formed to remove ghost light. In this case, if the basic shape without a chamfer or a light-shielding groove is at least an octahedron or the shape with two rectangular pyramid parts arranged on both sides of a plane orthogonal to the side AF as shown in FIG. 10D, such a prism is included in embodiments of the present invention. This will also be the same for a case with two rectangular pyramid frustum parts arranged on both sides of the plane orthogonal to the side AF as will be described later.

FIGS. 11A to 11D show a color separation/combination prism of a further different shape. When considering an actual luminous flux, an area of an entrance surface and an area of an emergence surface need to be larger than the area facing the panel. This color separation/combination prism, 2", is formed so as to efficiently secure the area of the entrance surface, the area of the emergence surface, and the area facing the panel. More specifically, the color separation/combination prism 2" is formed such that the luminous flux is optimal with respect to a light ray having an F-number of approximately 8°.

In this color separation/combination prism 2" whose respective sizes are shown in the field of "prism 3" in Table 1, the base angle θ is 65.0°. According to the sectional view in FIG. 11C, a light ray (not shown) entering the prism 2" from the entrance surface (surface AEB) perpendicularly thereto forms an angle of 25° with respect to the axis of symmetry AF. In this case, as shown in FIG. 11D, areas 25 and 26 of the entrance surface and the emergence surface are arranged so as to be contained in the isosceles triangles AEB and ACD, respectively. On the other hand, the area facing the panel, for example, the area for the panel 5G facing the surface FDB is arranged so as to contact the base of the isosceles triangle FDB.

In this case, the upper part and lower part of the color separation/combination prism 2" are optically unnecessary, so that these parts can be cut. In this case, as shown in FIG. 11E, the shape is as if the bases (surfaces orthogonal to the side AF) of two rectangular pyramid frustums each having four trapezoidal surfaces are joined to each other, thus allowing a reduction of the size of the prism 2".

With respect to the light ray entering the color separation/combination prism 2" shown in FIG. 11A or 11E from the illumination optical system 1, the light ray emerging from the prism 2" toward the projection lens 3 as the image light is tilted by 50.0°. This embodiment presupposes that the panel has an aspect ratio of approximately 3:4, which is the same as that of a standard TV system. In this case, it is the best to arrange the panel so that the base of the isosceles triangle or the trapezoid is parallel to the long side of the panel (screen). However, the method of arranging the panel is not limited to this, and an optimum arrangement method with respect to the size or aspect ratio of the panel may be used.

Table 2 shows a design example of the dichroic polarizing film I used for the color separation/combination prism of numerical example 1. The dichroic polarizing film I is a multilayer film in which plural thin films are laminated, and Table 4 shows media (dielectrics) which constitute the thin films. The media are assigned symbols of H, M, and L in descending order of refractive index. The multilayer film shown in Table 2 is obtained by laminating forty-one layers, which are vapor-deposited on the bonding surface ABFD.

Figure 12:
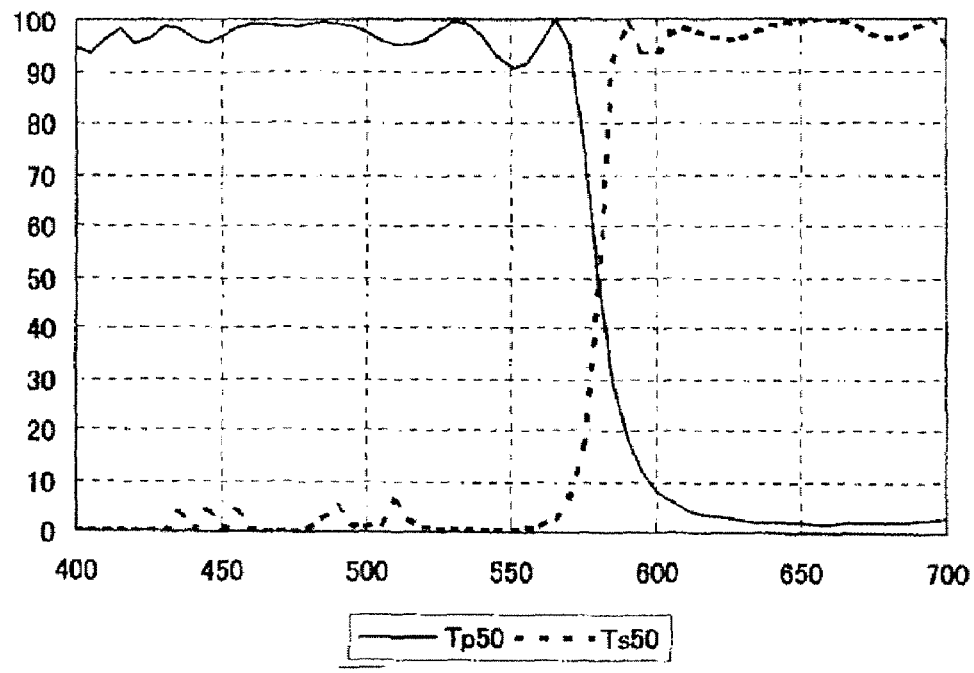
FIGS. 12 and 13 are graphs showing spectral characteristics of the dichroic polarizing films (numerical example) of Embodiment 1.

FIG. 12 shows spectral transmittances for P-polarized light and S-polarized light at an incident angle of 50° of the dichroic polarizing film I shown in Table 2. The transmittance characteristic (Tp50) for the P-polarized light and the transmittance characteristic (Ts50) for the S-polarized light are reversed in shorter and longer wavelength regions than approximately 580 nm.

In the B and G wavelength regions which are shorter wavelength regions than approximately 580 nm, 90 to 100% of the S-polarized light is reflected by the film I, and 90 to 100% of the P-polarized light is transmitted therethrough. On the other hand, in the R wavelength region which is longer wavelength region than approximately 580 nm, 90 to 100% of the S-polarized light is transmitted through the film I, and 90 to 100% of the P-polarized light is reflected thereby.

Table 3 shows a design example of the dichroic polarizing film II used for the color separation/combination prism of numerical example 1. As in the case of the dichroic polarizing film I, the dichroic polarizing film II is also a multilayer film in which plural thin films are laminated, and Table 5 shows media (dielectrics) which constitute the thin films. The media are assigned symbols of H, M, and L in descending order of refractive index. The multilayer film shown in Table 3 is formed by laminating thirty-nine layers, which are vapor-deposited on the bonding surface ACFE.

Figure 13:
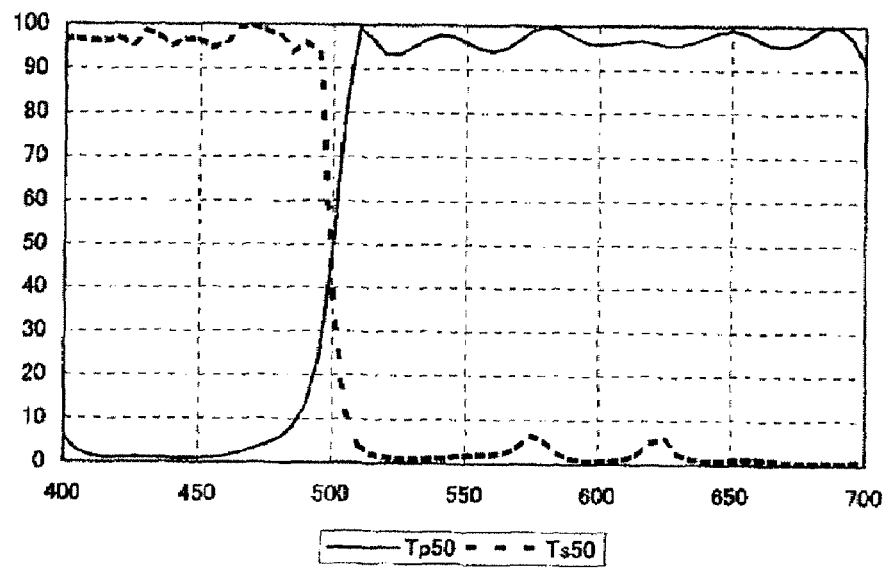

FIG. 13 shows spectral transmittances of P-polarized light and S-polarized light at an incident angle of 500 of the dichroic polarizing film II shown in Table 3. The transmittance characteristic (Tp50) for the P-polarized light and the transmittance characteristic (Ts50) for the S-polarized light are reversed in shorter and longer wavelength regions than approximately 500 nm.

In the B wavelength region which is shorter wavelength region than approximately 500 nm, 90 to 100% of the S-polarized light is transmitted through the film II, and 90 to 100% of the P-polarized light is reflected thereby. On the other hand, in the G and R wavelength regions which are longer wavelength region than approximately 500 nm, 90 to 100% of the S-polarized light is reflected by the film II, and 90 to 100% of the P-polarized light is transmitted therethrough.

In the optical system of embodiments of the present invention, the arrangement relationship of the color separation/combination prism and panels 5R, 5G, and 5B is not limited to that of above described Embodiment 1. For example, the positions of the panel 5R and panel 5B with respect to the color separation/combination prism in Embodiment 1 may be switched around and the positions of the dichroic polarizing film I and dichroic polarizing film II may be switched around.

Second Embodiment

FIG. 14A shows an image-forming optical system constituted by a color separation/combination prism that is Embodiment 2 of the present invention and three liquid crystal panels. This embodiment corresponds to one in which the positions of the panels 5R and 5B are switched around and the positions of the dichroic polarizing film I and dichroic polarizing film II are switched around with respect to Embodiment 1.

In this embodiment, the same components as those in Embodiment 1 will be described with the same reference numerals as those in Embodiment 1. The configuration and manufacturing method of a color separation/combination prism 102 in this embodiment are basically the same as those of the color separation/combination prism of Embodiment 1. The only difference is that the positions of the dichroic polarizing film I and dichroic polarizing film II are different.

As shown in FIG. 14B, the color separation/combination prism 102 has an area 25 as an entrance surface on a surface AEB. Furthermore, as shown in FIG. 14C, it has an area 26 as an emergence surface on a surface ACD.

Furthermore, as shown in FIG. 14D, a panel 5G is arranged so as to be close to and face a surface EBF as a transmission surface.

In this embodiment, as shown in FIG. 14E, a panel 5B is arranged so as to be close to and face a surface DEF as a transmission surface. Moreover, as shown in FIG. 14F, a panel 5R is arranged so as to be close to and face a surface BCF as a transmission surface.

In this embodiment as in the case of

Embodiment 1, the panel 5G is arranged in parallel to the surface EBF and the emergence surface ACD. Furthermore, the panel 5G and panel 5B are arranged in a mirror image relationship with respect to the dichroic polarizing film I. Moreover, the panel 5G and panel 5R are arranged in a mirror image relationship with respect to the dichroic polarizing film II. The panels 5G, 5B, 5R are arranged so that the optical axis of the projection lens 3 is perpendicular to each panel surface in this embodiment, too.

As in the case of Embodiment 1, the wavelength region of G corresponds to a first wavelength region, the wavelength region of B corresponds to a second wavelength region, and the wavelength region of R corresponds to a third wavelength region in this embodiment. Furthermore, a first image-forming element corresponds to the panel 5G, a second image-forming element corresponds to the panel 5B, and a third image-forming element corresponds to the panel 5R.

In this embodiment, the dichroic polarizing film II is arranged on a bonding surface ABFD. Furthermore, the dichroic polarizing film I is arranged on a bonding surface ACFE. The more specific structure and characteristic of each dichroic polarizing film are the same as those described in Embodiment 1.

S-polarized light of G and P-polarized light of B and R from the illumination optical system 1 enter the color separation/combination prism 102 from the entrance surface (area 25) as in the case of Embodiment 1.

Next, color separation, light analysis and color combination actions of the color separation/combination prism 102 will be described. In the following description, "upward" and "downward" mean upward and downward in a side view.

The optical path followed by the S-polarized light of G in the color separation/combination prism 102 is the same as that described in FIGS. 6A to 6C in Embodiment 1. However, the order of reflection and transmission by the dichroic polarizing films I and II is different. The optical path of the S-polarized light of G will be described in brief by reading the color separation/combination prism 2 in FIGS. 6A to 6C as 102, and the dichroic polarizing films II and I as dichroic polarizing films I and II, respectively.

Out of the S-polarized light of G (G-S) that has entered the prism 102 through the entrance surface AEB (area 25) from the illumination optical system 1, the polarized light component incident on the dichroic polarizing film I on a surface AFE is reflected thereby obliquely downward and then reflected obliquely downward by the dichroic polarizing film II on a surface AFB. The polarized light component then emerges from the surface FBE to reach the panel 5G. Furthermore, out of the S-polarized light of G, the polarized light component incident on the dichroic polarizing film II on the surface AFB is reflected thereby obliquely downward and then reflected obliquely downward by the dichroic polarizing film I on the surface AFE. The polarized light component then emerges from the surface FBE to reach the panel 5G. In this way, most of the S-polarized light of G that has entered the prism 102 from the entrance surface AEB enters the panel 5G.

The dichroic polarizing films I and II which extend in two directions orthogonal to each other have the reflection function as a so-called penta-Dach mirror for the S-polarized light of G. The S-polarized light of G emerges from the surface FBE perpendicularly thereto and then enters the panel 5G perpendicularly thereto.

The G light that has entered the panel 5G is image-modulated and reflected thereby, and then reentered the color separation/combination prism 102 from the surface EBF. Out of the image-modulated G light, the S-polarized light component is reflected obliquely upward twice by the penta-Dach mirror function of the dichroic polarizing film I on the surface AFE and the dichroic polarizing film II on the surface AFB, and returned to the illumination optical system 1 to be removed from the projection light.

On the other hand, the G image light which is the P-polarized light component of the image-modulated G light (G-P) is transmitted through the dichroic polarizing film I on the surface AFE and the dichroic polarizing film II on the surface AFB obliquely upward. Moreover, the G image light is then transmitted through the dichroic polarizing film II on the surface AFD and the dichroic polarizing film I on the surface AFC obliquely upward and emerges from the surface ACD (area 26) of the color separation/combination prism 102 to proceed toward the projection lens 3.

Figure 15A:
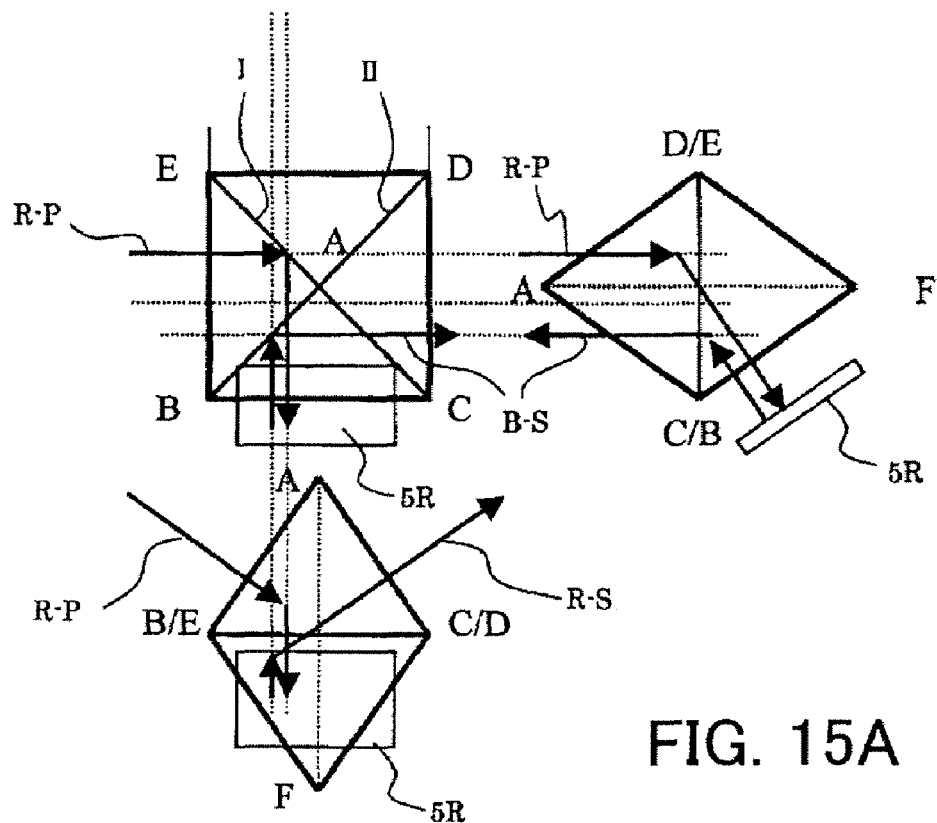
FIGS. 15A to 15C are optical path diagrams of R light according to Embodiment 2.

FIG. 15A shows a top view and two side views of an optical path in the color separation/combination prism 102 followed by the R light viewed from three directions. Of the two side views, the view from the surface ACD, FCD side (diagram on the right side) will hereinafter be referred to as a first side view. Furthermore, the view from the surface ABC, FBC side (diagram at the bottom) will hereinafter be referred to as a second side view.

Figures 15B, 15C:
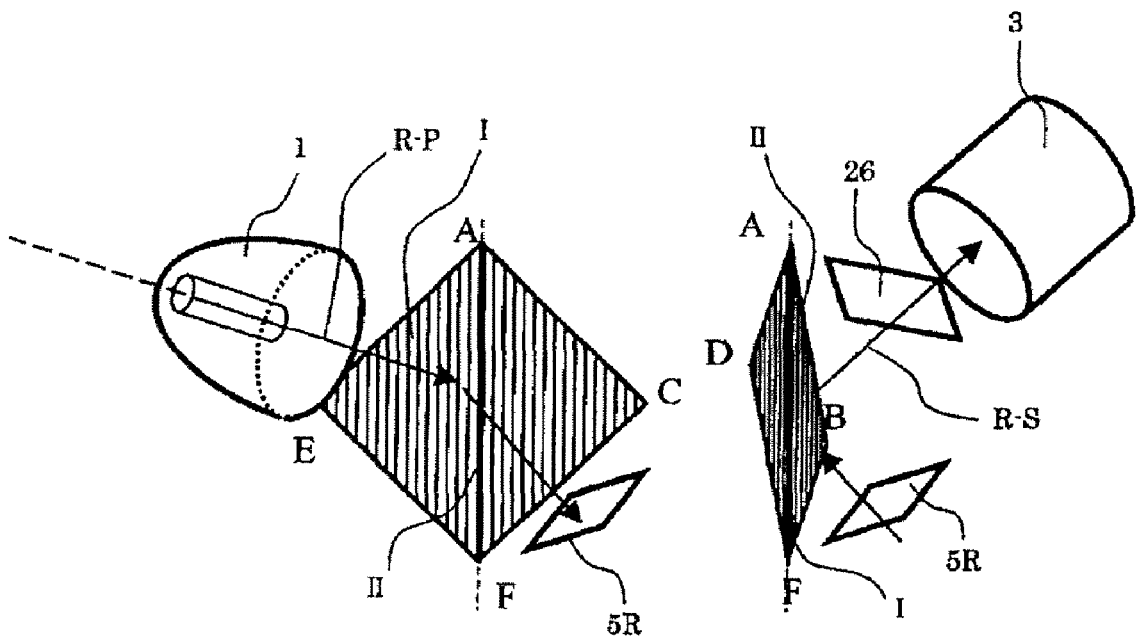

Furthermore, FIG. 15B shows an optical path of the entering light from the illumination optical system 1 up to the panel 5R, and FIG. 15C shows an optical path of the reflected light from the panel 5R up to the projection lens 3. These FIGS. 15B and 15C show the dichroic polarizing films I and II extracted from the color separation/combination prism 102.

Out of the P-polarized light of R (R-P) that has entered the prism 102 by being transmitted through the entrance surface AEB from the illumination optical system 1, the polarized light component incident on the dichroic polarizing film I on the surface AFE is reflected thereby obliquely downward and then transmitted through the dichroic polarizing film II on the surface AFB obliquely downward. The polarized light component then emerges from the surface FBC to reach the panel 5R.

Furthermore, out of the P-polarized light of R (R-P), the polarized light component incident on the dichroic polarizing film II on the surface AFB is transmitted therethrough obliquely downward and then reflected by the dichroic polarizing film I on the surface AFC obliquely downward. The polarized light component then emerges from the surface FBC to reach the panel 5R. In this way, most of the P-polarized light of R that has entered the prism 102 from the entrance surface AEB enters the panel 5R.

In the case of reflection by the dichroic polarizing film I, as is seen in the top view in FIG. 15A, the P-polarized light of R that has entered the prism 102 from the illumination optical system 1 is reflected as if being deflected by 90° by the straight line EC.

Furthermore, as is appreciated from the second side view of FIG. 15A, the P-polarized light of R enters the prism 102 from the surface AEB perpendicularly thereto and then emerges from the surface FBC perpendicularly thereto as is appreciated from the first side view. Moreover, the P-polarized light of R that has emerged from the surface FBC enters the panel 5R perpendicularly thereto.

The R light that has entered the panel 5R is image-modulated and reflected thereby and then reenters the color separation/combination prism 102 from the surface FBC.

Out of the image-modulated R light, the P-polarized light component and the S-polarized light component which is R image light (R-S) proceeds as follows. The P-polarized light component returns to the illumination optical system 1 via transmission through the dichroic polarizing film II on the surface AFB and reflection by the dichroic polarizing film I on the surface AFE, or reflection by the dichroic polarizing film I on the surface AFC and transmission through the dichroic polarizing film II on the surface AFB. In this way, the P-polarized light component is removed from the projection light.

On the other hand, the S-polarized light component (B image light) proceeds toward the surface ACD via reflection by the dichroic polarizing film II on the surface AFB and transmission through the dichroic polarizing film I on the surface AFC, or transmission through the dichroic polarizing film I on the surface AFC and reflection by the dichroic polarizing film II on the surface AFD. The B image light then emerges from the surface ACD to proceed toward the projection lens 3. With respect to the R light, transmission and reflection through/by each dichroic polarizing film are performed obliquely upward.

Figure 16A:
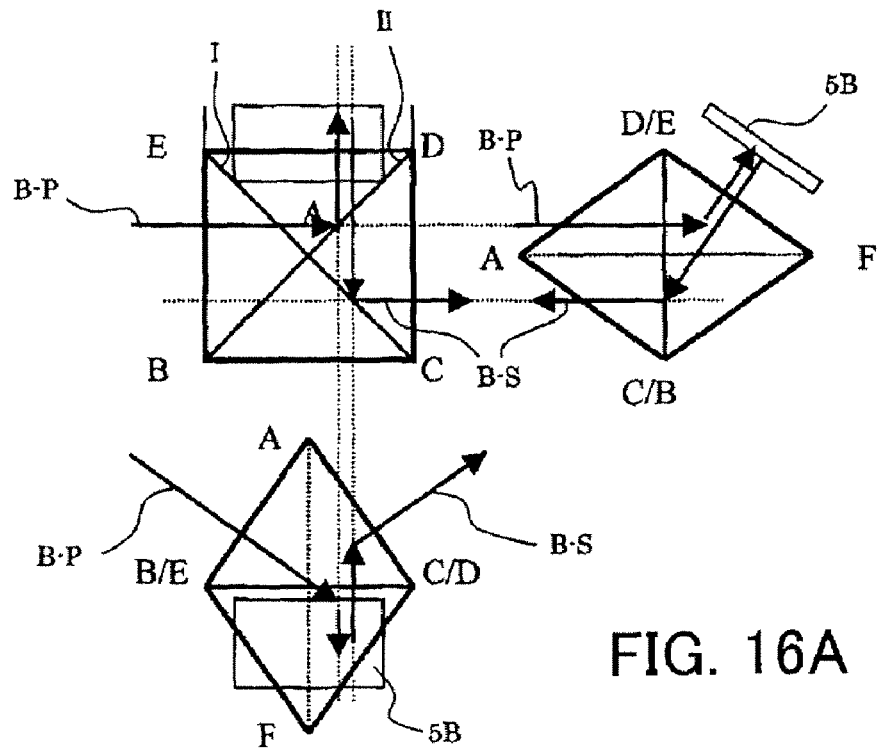
FIGS. 16A to 16C are optical path diagrams of B light according to Embodiment 2.

FIG. 16A shows a top view and two side views of an optical path in the color separation/combination prism 102 followed by the B light viewed from three directions. Of the two side views, the view from the surface ACD, FCD side (diagram on the right side) will hereinafter be referred to as a first side view. Furthermore, the view from the surface ABC, FBC side (diagram at the bottom) will hereinafter be referred to as a second side view.

Figures 16B, 16C:
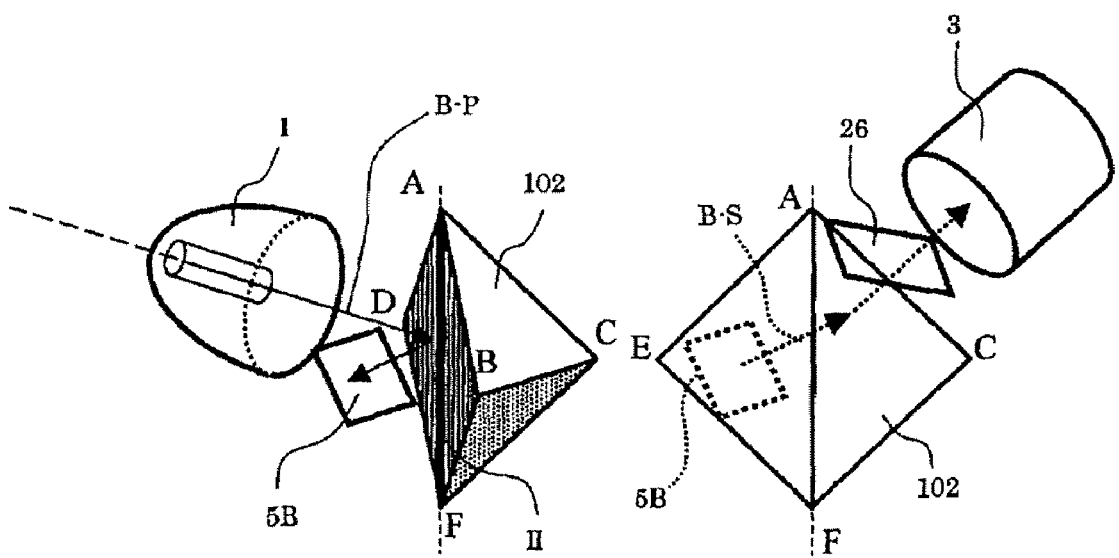

Furthermore, FIG. 16B shows an optical path of the entering light from the illumination optical system 1 up to the panel 5B, FIG. 16C shows an optical path of the reflected light from the panel 5B up to the projection lens 3. These FIGS. 16B and 16C show only a part of the color separation/combination prism 102.

Out of the P-polarized light of B (B-P) that has entered the prism 102 by being transmitted through the entrance surface AEB from the illumination optical system 1, the polarized light component incident on the dichroic polarizing film I on the surface AFE is transmitted therethrough obliquely downward and then reflected by the dichroic polarizing film II on the surface AFD obliquely downward. The polarized light component then emerges from the surface FED to reach the panel 5B. Furthermore, out of the P-polarized light of B (B-P), the polarized light component incident on the dichroic polarizing film II on the surface AFB is reflected thereby obliquely downward and then transmitted through the dichroic polarizing film I on the surface AFE obliquely downward. The polarized light component then emerges from the surface FED to reach the panel 5B. In this way, most of the P-polarized light of B that has entered the prism 102 from the entrance surface AEB enters the panel 5B.

In the case of reflection by the dichroic polarizing film II, as is seen in the top view in FIG. 16A, the P-polarized light of B that has entered the prism 102 from the illumination optical system 1 is reflected as if being deflected by 90° by the straight line DB.

Furthermore, as is appreciated from the second side view of FIG. 16A, the P-polarized light of B enters the prism 102 from the surface AEB perpendicularly thereto and then emerges from the surface FED perpendicularly thereto. Moreover, the P-polarized light of B that has emerged from the surface FED enters the panel 5B perpendicularly thereto.

The B light that has entered the panel 5B is image-modulated and reflected thereby, and then reenters the color separation/combination prism 102 from the surface FED.

Out of the image-modulated B light, the P-polarized light component and the S-polarized light component which is B image light (B-S) proceeds as follows. The P-polarized light component returns to the illumination optical system 1 via reflection by the dichroic polarizing film II on the surface AFD and transmission through the dichroic polarizing film I on the surface AFE, or transmission through the dichroic polarizing film I on the surface AFE and reflection by the dichroic polarizing film II on the surface AFB. In this way, the P-polarized light component is removed from the projection light.

On the other hand, the S-polarized light component (B image light) proceeds toward the surface ACD via transmission through the dichroic polarizing film II on the surface AFD and reflection by the dichroic polarizing film I on the surface AFC, or reflection by the dichroic polarizing film I on the surface AFE and transmission through the dichroic polarizing film II on the surface AFD. The B image light then emerges from the surface ACD to proceed toward the projection lens 3. With respect to the B light, transmission and reflection through/by each dichroic polarizing film are performed obliquely upward.

As described above, the color combined image light formed by the P-polarized light of G and the S-polarized light of R and B that has emerged from the surface ACD of the color separation/combination prism 102 and entered the projection lens 3 is projected onto the projection surface and thereby a full-color image is displayed.

The shapes shown in "prism 1" to "prism 3", the shapes described in FIGS. 10D and 11E described in Table 1 or the like may be used as the specific shape of the color separation/combination prism 102 in this embodiment, too.

According to each of the above-described embodiments, it is possible to perform color separation, light analysis and color combination using one (one-piece) prism. Furthermore, since the wavelength-selective polarizing film does not exist on the optical surfaces which are the outer surfaces of the prism, there is no adverse influence on images formed by the image-forming elements which receive light from the optical surfaces. Therefore, it is possible to reduce the number of parts for the optical system as a whole and realize a compact optical system and a compact image-projection apparatus.

The above Embodiments 1 and 2 have described the case where four small prisms are bonded together to form the color separation/combination prism, but each small prism may be formed by bonding together a plurality of (e.g., two) prisms. In other words, if a color separation/combination prism includes four prism members partitioned by the dichroic polarizing films, such a prism is included in embodiments of the present invention.

Furthermore, the arrangement of the panels for R, G, and B and the polarization directions of entering R light, G light, and B light are not limited to those described in the above Embodiments 1 and 2. The characteristics of the dichroic polarizing films may be adjusted as appropriate according to the arrangement of the panels and the polarization directions of the R light, G light, and B light incident thereon.

Furthermore, Embodiments 1 and 2 have described the case where the dichroic polarizing film I is arranged on one of the bonding surfaces ABFD, ACFE and the dichroic polarizing film II" is arranged on the other, but the arrangement of the dichroic polarizing film is not limited thereto. For example, the following arrangement may also be used.

The dichroic polarizing film II shown in FIG. 5B is arranged on the bonding surface AFE and the dichroic polarizing film I shown in FIG. 5A is arranged on the bonding surface AFB. Furthermore, as shown in FIG. 17B, a dichroic polarizing film II, which corresponds to one that the transmittance for the S-polarized light of G of the dichroic polarizing film II is increased to a level equivalent to the transmittance for the P-polarized light is arranged on the bonding surface AFC. Furthermore, as shown in FIG. 17A, a dichroic polarizing film I', which corresponds to one that the transmittance for the S-polarized light of G of the dichroic polarizing film I is increased to a level equivalent to the transmittance for the P-polarized light is arranged on the bonding surface AFD.

As described above, in addition to the cross-arrangement of the two dichroic polarizing films, the cross-arrangement of the four dichroic polarizing films can be used.

Furthermore, the above-described embodiments have handled the wavelength region of G as the first wavelength region, the wavelength region of B as the second wavelength region and the wavelength region of R as the third wavelength region. However, the first to third wavelength regions are not limited in such a way in embodiments of the present invention.

Furthermore, the above-described embodiments have described the projector using the reflective liquid crystal panels as the image-forming elements, but the image-forming element is not limited thereto, and other image-forming elements (image-modulation elements) such as digital micro mirror devices may also be used.

Here, it is preferable that the $\theta$ satisfies the following conditional expression (3):

$$40 < \theta < 75 \text{ [deg]} \tag{3}$$

Satisfying this conditional expression enables use of the color separation/combination prism for a bright illumination optical system having a small F-number on the image-forming-element side and reduce the size of the color separation/combination prism, that is, the image-projection apparatus. The $\theta$ is an angle that is formed by one of the eight isosceles triangles constituting the above-described octahedron and the square surface formed by the bases of the isosceles triangles. In other words, the $\theta$ is an angle that is formed by the normal to the surface of one isosceles triangle of the octahedron and the normal to the above-described square surface.

Furthermore, the surface of the isosceles triangle can be considered as the surface of an image-forming element facing one of the five optical surfaces on the color separation/combination prism, a surface perpendicular to the optical axis of the illumination optical system introducing light to the optical surface, or a surface perpendicular to the optical axis of the projection optical system introducing light that has emerged from the optical surface to the projection surface.

It is more preferable that the $\theta$ satisfies the following conditional expression (3a), and it is still further preferable that the $\theta$ satisfies the following conditional expression (3b):

$$50 < \theta < 72 \text{ [deg]} \tag{3a}$$

$$54 < \theta < 70 \text{ [deg]} \tag{3b}$$

Furthermore, the present invention is not limited to these preferred embodiments and various variations and modifications may be made without departing from the scope of the present invention.

This application claims foreign priority benefits based on Japanese Patent Application No. 2006-102284, filed on Apr. 3, 2006, which is hereby incorporated by reference herein in its entirety as if fully set forth herein.

TABLE 1

|  | a | b | c | h | θ |
|---|---|---|---|---|---|
| PRISM 1 | 1 | 1 | $\frac{\sqrt{3}}{2}$ | $\frac{\sqrt{2}}{2}$ | 54.7 |
| PRISM 2 | 1 | $\frac{\sqrt{3}}{2}$ | $\frac{\sqrt{2}}{2}$ | 0.5 | 45.0 |
| PRISM 3 | 1 | 1.284 | 1.183 | 1.072 | 65.0 |

TABLE 2

| PBH56 | |
|---|---|
| 1 | 249.93M |
| 2 | 83.06L |
| 3 | 28.99H |
| 4 | 259.7M |
| 5 | 26.05H |
| 6 | 118.69L |
| 7 | 45.1H |
| 8 | 272.76M |
| 9 | 106.96L |
| 10 | 22.27H |
| 11 | 270.62M |
| 12 | 13.58H |
| 13 | 90.15L |
| 14 | 13.9H |
| 15 | 273.26M |
| 16 | 26.41H |
| 17 | 122.69L |
| 18 | 44.22H |
| 19 | 266.75M |
| 20 | 103.31L |
| 21 | 18.41H |
| 22 | 269.62M |
| 23 | 16.68H |
| 24 | 98.12L |
| 25 | 263.2M |
| 26 | 48.26H |
| 27 | 120.62L |
| 28 | 42.97H |
| 29 | 264.14M |
| 30 | 9.95H |
| 31 | 101.42L |
| 32 | 9.22H |
| 33 | 189.41M |
| 34 | 46.45H |
| 35 | 194.95M |
| 36 | 31.35H |
| 37 | 191.97M |
| 38 | 21.84H |
| 39 | 193.4M |
| 40 | 38.87H |
| 41 | 183.34M |
| ADHESIVE | |

TABLE 3

| PBH56 | |
|---|---|
| 1 | 180.22M |
| 2 | 346.13L |
| 3 | 127.52M |
| 4 | 58.94H |
| 5 | 130.04M |
| 6 | 280.39L |
| 7 | 145.92M |
| 8 | 56.28H |
| 9 | 136.59M |
| 10 | 292.21L |
| 11 | 130.17M |
| 12 | 55.36H |
| 13 | 155.72M |
| 14 | 276.56L |
| 15 | 197.82M |
| 16 | 42.23H |
| 17 | 132.7M |
| 18 | 212.38L |
| 19 | 142.12M |
| 20 | 42.18H |
| 21 | 180.74M |
| 22 | 321.85L |
| 23 | 100.82M |
| 24 | 71.45H |
| 25 | 95.5M |
| 26 | 417.57L |
| 27 | 161.09M |
| 28 | 63.5H |
| 29 | 280.52M |
| 30 | 30.67H |
| 31 | 206.48M |
| 32 | 91.33H |
| 33 | 217.96M |
| 34 | 111.97H |
| 35 | 252.91M |
| 36 | 86.53H |
| 37 | 219.46M |
| 38 | 92.05H |
| 39 | 109.37M |
| ADHESIVE | |

TABLE 4

| H | TiO2 |
|---|---|
| M | Al2O3 |
| L | MgF2 |

TABLE 5

| H | TiO2 |
|---|---|
| M | Al2O3 |
| L | SiO2 |

What is claimed is:

1. A color separation/combination prism comprising four prism members,
    wherein the color separation/combination prism includes at least five optical surfaces as outer surfaces thereof,
    wherein each of the prism members has at least three optical surfaces including two optical surfaces which intersect orthogonally with each other at a first side thereof,
    wherein the four prism members are joined together such that the first sides of the prism members are adjacent to or contact each other,
    wherein joining portions of the four prism members are provided with wavelength-selective polarizing films,
    wherein the positional relationship between the five optical surfaces coincides with the positional relationship between five of eight surfaces of an octahedron that is defined as a three-dimensional shape with an outer surface consisting of eight isosceles triangles having an identical shape, wherein the color separation/combination prism includes an entrance surface for entrance of light from an illumination system, an emergence surface for emergence of light toward a projection system, and three transmission surfaces which serve as surfaces for image-forming elements, and wherein the entrance surface and the emergence surface are arranged on two surfaces of the octahedron, the two surfaces being located on one of two sides of a square surface which includes bases of the eight isosceles triangles of the octahedron, and the three transmission surfaces are arranged on three surfaces of the octahedron, the three surfaces being located on the other side of the square surface.

2. The color separation/combination prism according to claim 1, further comprising first and second wavelength-selective polarizing films, wherein:

in a first wavelength region, the first and second wavelength-selective polarizing films have a characteristic in which their transmittance for linearly-polarized light having the same polarization direction as that of entering linearly-polarized light which enters the prism through the entrance surface is lower than their transmittance for linearly-polarized light having a polarization direction orthogonal to that of the entering linearly-polarized light, in a second wavelength region, the first wavelength-selective polarizing film has a characteristic in which its transmittance for linearly-polarized light having the same polarization direction as that of entering linearly-polarized light which enters the prism through the entrance surface is higher than its transmittance for linearly-polarized light having a polarization direction orthogonal to that of the entering linearly-polarized light, and the second wavelength-selective polarizing film has a characteristic in which its transmittance for linearly-polarized light having the same polarization direction as that of the entering linearly-polarized light is lower than its transmittance for linearly-polarized light having the polarization direction orthogonal to that of the entering linearly-polarized light, and in a third wavelength region, the first wavelength-selective polarizing film has a characteristic in which its transmittance for linearly-polarized light having the same polarization direction as that of entering linearly-polarized light which enters the prism through the entrance surface is lower than its transmittance for linearly-polarized light having a polarization direction orthogonal to that of the entering linearly-polarized light, and the second wavelength-selective polarizing film has a characteristic in which its transmittance for linearly-polarized light having the same polarization direction as that of the entering linearly-polarized light is higher than its transmittance for linearly-polarized light having the polarization direction orthogonal to that of the entering linearly-polarized light.

3. An image-projection apparatus comprising:
an illumination system;
first, second, and third image-forming elements;
a color separation/combination prism for guiding light from the illumination system to the first to third image-forming elements based on wavelength regions and causing light from the first to third image-forming elements to emerge; and
a projection system for projecting the light from the color separation/combination prism, wherein:
  the color separation/combination prism comprises four prism members,
  the color separation/combination prism includes at least five optical surfaces as outer surfaces thereof,
  each of the prism members has at least three optical surfaces including two optical surfaces which intersect orthogonally with each other at a first side thereof,
  the four prism members are joined together such that the first sides of the prism members are adjacent to or contact each other,
  joining portions of the four prism members are provided with wavelength-selective polarizing films,
  the positional relationship between the five optical surfaces coincides with the positional relationship between five of eight surfaces of an octahedron that is defined as a three-dimensional shape with an outer surface consisting of eight isosceles triangles having an identical shape,
  the color separation/combination prism includes an entrance surface for entrance of light from an illumination system, an emergence surface for emergence of light toward a projection system, and three transmission surfaces which serve as surfaces for image-forming elements, and
  the entrance surface and the emergence surface are arranged on two surfaces of the octahedron, the two surfaces being located on one of two sides of a square surface which includes bases of the eight isosceles triangles of the octahedron, and the three transmission surfaces are arranged on three surfaces of the octahedron, the three surfaces being located on the other side of the square surface.

4. An image-projection apparatus comprising:
an illumination system;
first, second, and third image-forming elements;
a color separation/combination prism for guiding light from the illumination system to the first to third image-forming elements based on wavelength regions and causing light from the first to third image-forming elements to emerge; and
a projection system for projecting the light from the color separation/combination prism,
wherein the color separation/combination prism comprises:
  first and second wavelength-selective polarizing films formed along two planes orthogonal to each other; and
  first to fourth prism members arranged between the first and second wavelength-selective polarizing films;
wherein:
  the first prism member includes an entrance surface for entrance of light components in three wavelength regions and a first transmission surface for emergence and reentrance of light component in one of the three wavelength regions after reflections by the first and second wavelength-selective polarizing films,
  the second and third prism members arranged on both sides of the first prism member have second and third transmission surfaces for emergence and reentrance of light components in the other two wavelength regions after reflection by or transmission through the first and second wavelength-selective polarizing films, the fourth prism member arranged between the second and third prism members and opposite to the first prism member has an emergence surface for emergence of the light components in the three wavelength regions after the reentrance through the first to third transmission surfaces and the reflection by or the transmission through the first and second wavelength-selective polarizing films, the first prism member includes the entrance surface through which light from the illumination system enters the prism and the first transmission surface facing the first image-forming element, the second and third prism members arranged on both sides of the first prism member include the second and third transmission surfaces facing the second and third image-forming elements, respectively, the fourth prism member arranged between the second and third prism members and opposite to the first prism member includes the emergence surface through which light from the first to third transmission surfaces toward the projection system, the first image-forming element and the emergence surface are arranged in parallel to each other, the first image-forming element and the second image-forming element are arranged so as to have a mirror image relationship with respect to the first wavelength-selective polarizing film, and the first image-forming element and the third image-forming element are arranged so as to have a mirror image relationship with respect to the second wavelength-selective polarizing film.

5. The image-projection apparatus according to claim 4, wherein:

linearly-polarized light in the first wavelength region from the illumination system reaches the first image-forming element via reflections by the first and second wavelength-selective polarizing films, linearly-polarized light in the second wavelength region from the illumination system reaches the second image-forming element via transmission through the first wavelength-selective polarizing film and reflection by the second wavelength-selective polarizing film, linearly-polarized light in the third wavelength region from the illumination system reaches the third image-forming element via reflection by the first wavelength-selective polarizing film and transmission through the second wavelength-selective polarizing film, of the linearly-polarized light in the first wavelength region after reaching the first image-forming element, the linearly-polarized light whose polarization direction is rotated by 90 degrees by the first image-forming element emerges from the prism toward the projection system via transmission through the first and second wavelength-selective polarizing films, of the linearly polarized light in the second wavelength region after reaching the second image-forming element, the linearly-polarized light whose polarization direction is rotated by 90 degrees by the second image-forming element emerges from the prism toward the projection system via reflection on the first wavelength-selective polarizing film and transmission through the second wavelength-selective polarizing film, and of the linearly polarized light in the third wavelength region after reaching the third image-forming element, the linearly-polarized light whose polarization direction is rotated by 90 degrees by the third image-forming element emerges from the prism toward the projection system via transmission through the first wavelength-selective polarizing film and reflection on the second wavelength-selective polarizing film.

* * * * *